US012812147B2

(12) United States Patent
Esenlik et al.

(10) Patent No.: US 12,812,147 B2
(45) Date of Patent: Nov. 24, 2026

(54) METHOD, APPARATUS, AND MEDIUM FOR DATA PROCESSING

(71) Applicants: Beijing Bytedance Network Technology Co., Ltd., Beijing (CN); Bytedance Inc., Los Angeles, CA (US)

(72) Inventors: Semih Esenlik, Los Angeles, CA (US); Yaojun Wu, Beijing (CN); Zhaobin Zhang, Los Angeles, CA (US); Yue Li, Los Angeles, CA (US); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/778,818

(22) Filed: Jul. 19, 2024

(65) Prior Publication Data

US 2024/0373048 A1 Nov. 7, 2024

Related U.S. Application Data

(63) Continuation of application No. PCT/CN2023/073423, filed on Jan. 20, 2023.

(30) Foreign Application Priority Data

Jan. 21, 2022 (WO) ................ PCT/CN2022/073109

(51) Int. Cl.
*H04N 19/42* (2014.01)
*H04N 19/124* (2014.01)
(Continued)

(52) U.S. Cl.
CPC ........... *H04N 19/42* (2014.11); *H04N 19/124* (2014.11); *H04N 19/132* (2014.11);
(Continued)

(58) Field of Classification Search
CPC .... H04N 19/42; H04N 19/124; H04N 19/132; H04N 19/136; H04N 19/184; H04N 19/192
See application file for complete search history.

(56) References Cited

U.S. PATENT DOCUMENTS

| | | | |
|---|---|---|---|
| 2020/0160565 A1 | 5/2020 | Ma et al. | |
| 2021/0218997 A1 | 7/2021 | Rezazadegan Tavakoli et al. | |
| 2023/0100413 A1* | 3/2023 | Zhu ........................... | G06T 7/11 375/240.18 |

FOREIGN PATENT DOCUMENTS

| | | |
|---|---|---|
| CN | 111163314 A | 5/2020 |
| CN | 111641832 A | 9/2020 |

(Continued)

OTHER PUBLICATIONS

International Search Report for PCT/CN2023/073423, mailed May 16, 2023, 3 pages.

(Continued)

*Primary Examiner* — On S Mung
(74) *Attorney, Agent, or Firm* — Astute IP Law Group

(57) ABSTRACT

Embodiments of the present disclosure provide a solution for data processing. A method for data processing is proposed. The method comprises: determining, during a conversion between data and a bitstream of the data, a first part of a first sample of a reconstructed latent representation of the data, the first part indicating a prediction of the first sample; determining a second part of the first sample, the
(Continued)

second part indicating a difference between the first sample and the first part; and performing the conversion based on the second part.

18 Claims, 17 Drawing Sheets

(51) Int. Cl.
*H04N 19/132* (2014.01)
*H04N 19/136* (2014.01)
*H04N 19/184* (2014.01)
*H04N 19/192* (2014.01)

(52) U.S. Cl.
CPC ......... *H04N 19/136* (2014.11); *H04N 19/184* (2014.11); *H04N 19/192* (2014.11)

(56) References Cited

FOREIGN PATENT DOCUMENTS

| | | | |
|---|---|---|---|
| WO | 2021201642 | A1 | 10/2021 |
| WO | 2021220008 | A1 | 11/2021 |

OTHER PUBLICATIONS

Extended European Search Report for European Patent Application No. 23743001.2, mailed on Oct. 31, 2025, 13 pages.
Minnen et al., "Channel-wise Autoregressive Entropy Models for Learned Image Compression", arXiv:2007.08739v1 [eess.IV], Jul. 17, 2020, 16 pages.
Minnen et al., "Joint Autoregressive and Hierarchical Priors for Learned Image Compression", NeurIPS, Dec. 6, 2018, 10 pages.
Wang et al., "[AI-3DGC] Point Cloud Attribute Compression using Sparse Tensor-Representation", International Organisation for Standardisation Organisation Internationale De Normalisation ISO/IEC JTC 1/SC 29/WG 7, Coding of Moving Pictures and Audio, m59037, Jan. 14, 2022, 8 pages.
Wang et al., "[G-PCC EE13.54] A Geometry Compression Framework for AI-based PCC via Sparse Convolution", International Organisation for Standardisation Organisation Internationale De Normalisation ISO/IEC JTC 1/SC 29/WG 7, Coding of Moving Pictures and Audio, m57453, Jul. 2021, 8 pages.

* cited by examiner

300

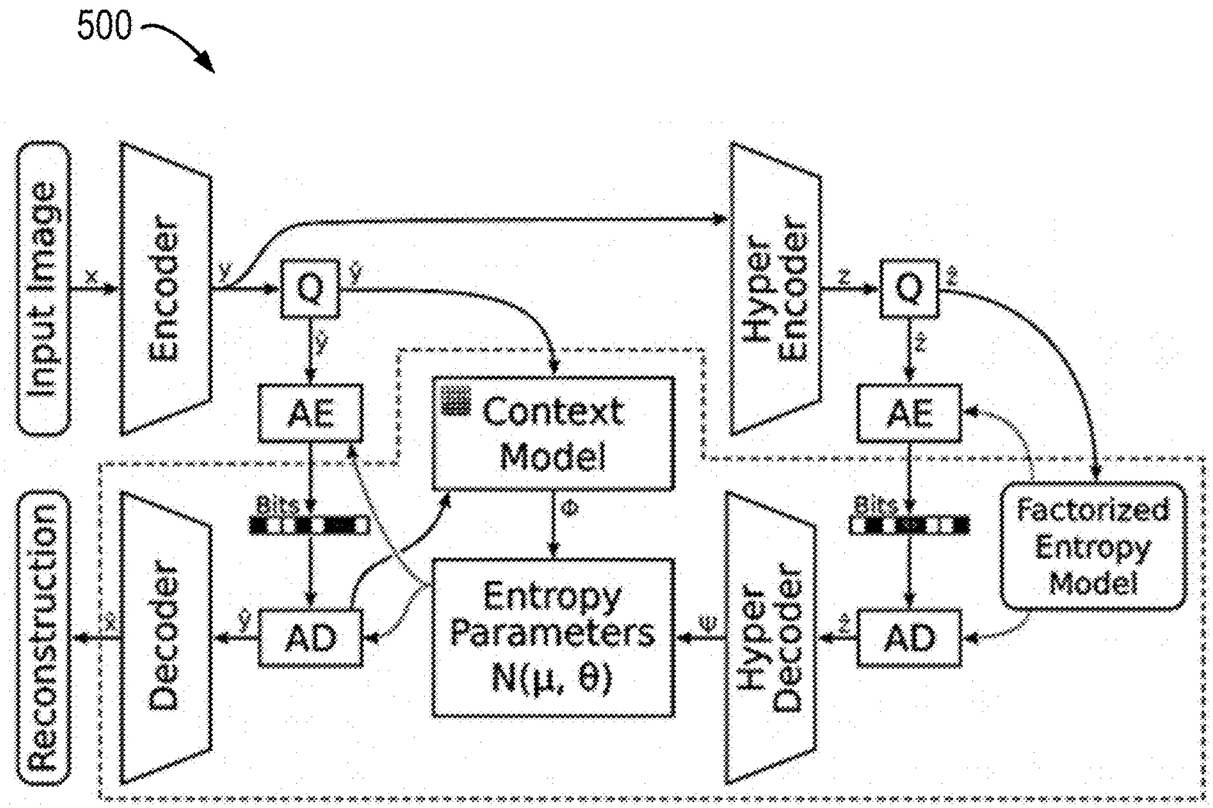

| Component | Symbol |
| --- | --- |
| Input Image | $\boldsymbol{x}$ |
| Encoder | $f(\boldsymbol{x}; \boldsymbol{\theta}_e)$ |
| Latents | $\boldsymbol{y}$ |
| Latents (quantized) | $\hat{\boldsymbol{y}}$ |
| Decoder | $g(\hat{\boldsymbol{y}}; \boldsymbol{\theta}_d)$ |
| Hyper Encoder | $f_h(\boldsymbol{y}; \boldsymbol{\theta}_{he})$ |
| Hyper-latents | $\boldsymbol{z}$ |
| Hyper-latents (quant.) | $\hat{\boldsymbol{z}}$ |
| Hyper Decoder | $g_h(\hat{\boldsymbol{z}}; \boldsymbol{\theta}_{hd})$ |
| Context Model | $g_{cm}(\boldsymbol{y}_{<i}; \boldsymbol{\theta}_{cm})$ |
| Entropy Parameters | $g_{ep}(\cdot; \boldsymbol{\theta}_{ep})$ |
| Reconstruction | $\hat{\boldsymbol{x}}$ |

Fig. 5

METHOD, APPARATUS, AND MEDIUM FOR DATA PROCESSING

CROSS REFERENCE

This application is a continuation of International Application No. PCT/CN2023/073423, filed on Jan. 20, 2023, which claims the benefit of International Application No. PCT/CN2022/073109 filed on Jan. 21, 2023. The entire contents of these applications are hereby incorporated by reference in their entireties.

FIELD

Embodiments of the present disclosure relates generally to data processing techniques, and more particularly, to neural network-based data coding.

BACKGROUND

The past decade has witnessed the rapid development of deep learning in a variety of areas, especially in computer vision and image processing. Neural network was invented originally with the interdisciplinary research of neuroscience and mathematics. It has shown strong capabilities in the context of non-linear transform and classification. Neural network-based image/video compression technology has gained significant progress during the past half decade. It is reported that the latest neural network-based image compression algorithm achieves comparable rate-distortion (R-D) performance with Versatile Video Coding (VVC). With the performance of neural image compression continually being improved, neural network-based video compression has become an actively developing research area. However, coding efficiency of neural network-based image/video coding is generally expected to be further improved.

SUMMARY

Embodiments of the present disclosure provide a solution for data processing.

In a first aspect, a method for data processing is proposed. The method comprises: determining, during a conversion between data and a bitstream of the data, a first part of a first sample of a reconstructed latent representation of the data, the first part indicating a prediction of the first sample; determining a second part of the first sample, the second part indicating a difference between the first sample and the first part; and performing the conversion based on the second part.

According to the method in accordance with the first aspect of the present disclosure, a reconstructed latent sample of data is divided into two parts, which enables a decoupling of a sequential entropy coding process from computationally complex neural network. Compared with the conversion solution where the entropy coding process and the neural network operations are interleaved, the proposed method advantageously enables the entropy coding process to be performed independently of the neural network, and thus the coding efficiency can be improved.

In a second aspect, an apparatus for processing data is proposed. The apparatus for processing data comprises a processor and a non-transitory memory with instructions thereon. The instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of data which is generated by a method performed by a data processing apparatus. The method comprises: determining a first part of a first sample of a reconstructed latent representation of the data, the first part indicating a prediction of the first sample; determining a second part of the first sample, the second part indicating a difference between the first sample and the first part; and generating the bitstream based on the second part.

In a fifth aspect, a method for storing a bitstream of data is proposed. The method comprises: determining a first part of a first sample of a reconstructed latent representation of the data, the first part indicating a prediction of the first sample; determining a second part of the first sample, the second part indicating a difference between the first sample and the first part; generating the bitstream based on the second part; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 5 illustrates a block diagram of a combined model;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
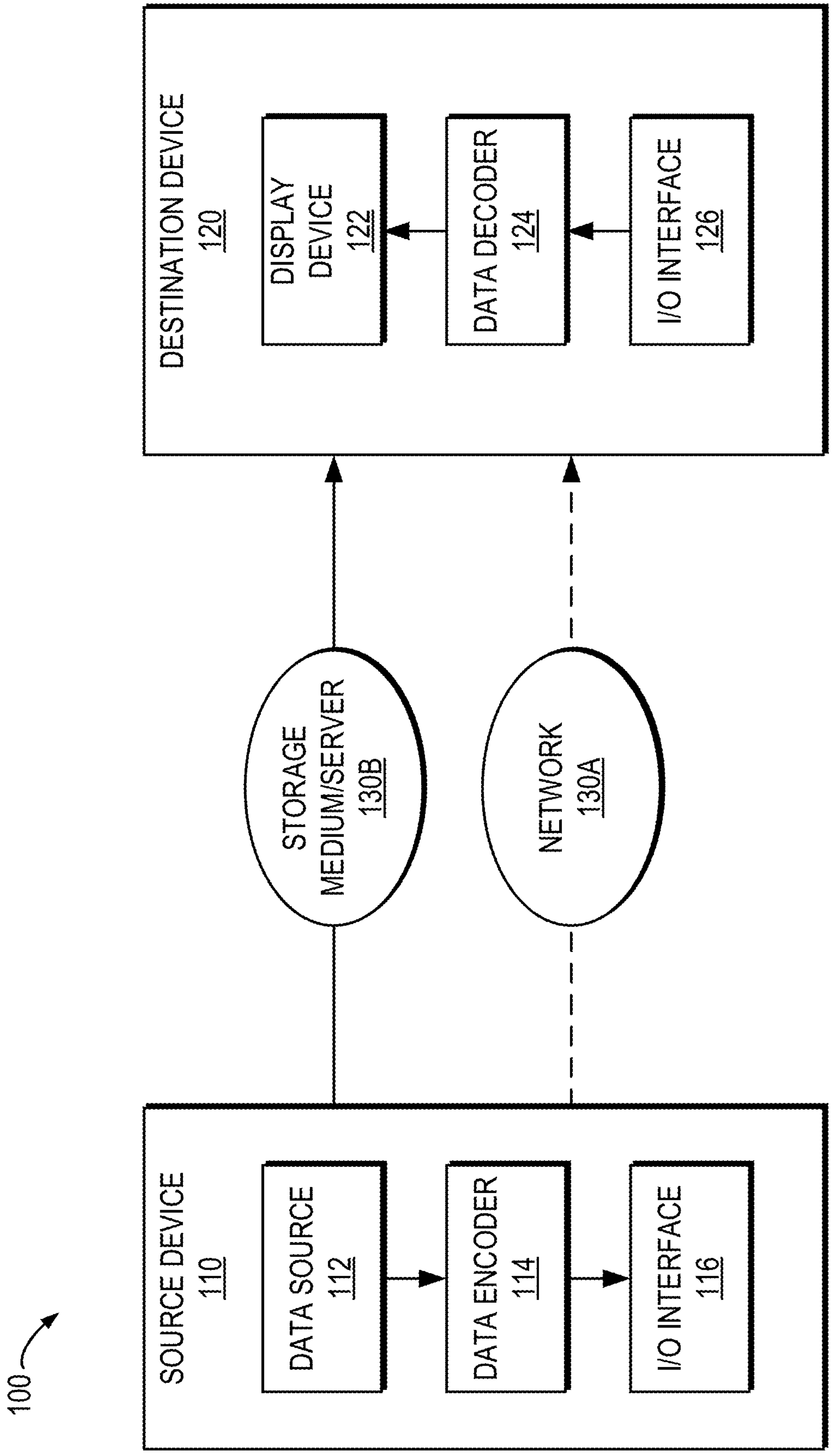
FIG. 1 illustrates a block diagram that illustrates an example data coding system, in accordance with some embodiments of the present disclosure.

FIG. 1 is a block diagram that illustrates an example data coding system 100 that may utilize the techniques of this disclosure. As shown, the data coding system 100 may include a source device 110 and a destination device 120. The source device 110 can be also referred to as a data encoding device, and the destination device 120 can be also referred to as a data decoding device. In operation, the source device 110 can be configured to generate encoded data and the destination device 120 can be configured to decode the encoded data generated by the source device 110. The source device 110 may include a data source 112, a data encoder 114, and an input/output (I/O) interface 116.

The data source 112 may include a source such as a data capture device. Examples of the data capture device include, but are not limited to, an interface to receive data from a data provider, a computer graphics system for generating data, and/or a combination thereof.

The data may comprise one or more pictures of a video or one or more images. The data encoder 114 encodes the data from the data source 112 to generate a bitstream. The bitstream may include a sequence of bits that form a coded representation of the data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded data may be transmitted directly to destination device 120 via the I/O interface 116 through the network 130A. The encoded data may also be stored onto a storage medium/server 130B for access by destination device 120.

The destination device 120 may include an I/O interface 126, a data decoder 124, and a display device 122. The I/O interface 126 may include a receiver and/or a modem. The I/O interface 126 may acquire encoded data from the source device 110 or the storage medium/server 130B. The data decoder 124 may decode the encoded data. The display device 122 may display the decoded data to a user. The display device 122 may be integrated with the destination device 120, or may be external to the destination device 120 which is configured to interface with an external display device.

The data encoder 114 and the data decoder 124 may operate according to a data coding standard, such as video coding standard or still picture coding standard and other current and/or further standards.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific data codecs, the disclosed techniques are applicable to other coding technologies also. Furthermore, while some embodiments describe coding steps in detail, it will be understood that corresponding steps decoding that undo the coding will be implemented by a decoder. Furthermore, the term data processing encompasses data coding or compression, data decoding or decompression and data transcoding in which data are represented from one compressed format into another compressed format or at a different compressed bitrate.

1. Summary

A neural network based image and video compression method comprising an auto-regressive subnetwork and an entropy coding engine, wherein entropy coding is performed independently of the auto-regressive subnetwork.

2. BACKGROUND

The past decade has witnessed the rapid development of deep learning in a variety of areas, especially in computer vision and image processing. Inspired from the great success of deep learning technology to computer vision areas, many researchers have shifted their attention from conventional image/video compression techniques to neural image/video compression technologies. Neural network was invented originally with the interdisciplinary research of neuroscience and mathematics. It has shown strong capabilities in the context of non-linear transform and classification. Neural network-based image/video compression technology has gained significant progress during the past half decade. It is reported that the latest neural network-based image compression algorithm achieves comparable R-D performance with Versatile Video Coding (VVC), the latest video coding standard developed by Joint Video Experts Team (JVET) with experts from MPEG and VCEG. With the performance of neural image compression continually being improved, neural network-based video compression has become an actively developing research area. However, neural network-based video coding still remains in its infancy due to the inherent difficulty of the problem.

2.1. Image/Video Compression

Image/video compression usually refers to the computing technology that compresses image/video into binary code to facilitate storage and transmission. The binary codes may or may not support losslessly reconstructing the original image/video, termed lossless compression and lossy compression. Most of the efforts are devoted to lossy compression since lossless reconstruction is not necessary in most scenarios. Usually the performance of image/video compression algorithms is evaluated from two aspects, i.e. compression ratio and reconstruction quality. Compression ratio is directly related to the number of binary codes, the less the better; Reconstruction quality is measured by comparing the reconstructed image/video with the original image/video, the higher the better.

Image/video compression techniques can be divided into two branches, the classical video coding methods and the neural-network-based video compression methods. Classical video coding schemes adopt transform-based solutions, in which researchers have exploited statistical dependency in the latent variables (e.g., DCT or wavelet coefficients) by carefully hand-engineering entropy codes modeling the dependencies in the quantized regime. Neural network-based video compression is in two flavors, neural network-based coding tools and end-to-end neural network-based video compression. The former is embedded into existing classical video codecs as coding tools and only serves as part of the framework, while the latter is a separate framework developed based on neural networks without depending on classical video codecs.

In the last three decades, a series of classical video coding standards have been developed to accommodate the increasing visual content. The international standardization organizations ISO/IEC has two expert groups namely Joint Photographic Experts Group (JPEG) and Moving Picture Experts Group (MPEG), and ITU-T also has its own Video Coding Experts Group (VCEG) which is for standardization of image/video coding technology. The influential video coding standards published by these organizations include JPEG, JPEG 2000, H.262, H.264/AVC and H.265/HEVC. After H.265/HEVC, the Joint Video Experts Team (JVET) formed by MPEG and VCEG has been working on a new video coding standard Versatile Video Coding (VVC). The first version of VVC was released in July 2020. An average of 50% bitrate reduction is reported by VVC under the same visual quality compared with HEVC.

Neural network-based image/video compression is not a new invention since there were a number of researchers working on neural network-based image coding. But the network architectures were relatively shallow, and the performance was not satisfactory. Benefit from the abundance of data and the support of powerful computing resources, neural network-based methods are better exploited in a variety of applications. At present, neural network-based image/video compression has shown promising improvements, confirmed its feasibility. Nevertheless, this technology is still far from mature and a lot of challenges need to be addressed.

2.2. Neural Networks

Neural networks, also known as artificial neural networks (ANN), are the computational models used in machine learning technology which are usually composed of multiple processing layers and each layer is composed of multiple simple but non-linear basic computational units. One benefit of such deep networks is believed to be the capacity for processing data with multiple levels of abstraction and converting data into different kinds of representations. Note that these representations are not manually designed; instead, the deep network including the processing layers is learned from massive data using a general machine learning procedure. Deep learning eliminates the necessity of handcrafted representations, and thus is regarded useful especially for processing natively unstructured data, such as acoustic and visual signal, whilst processing such data has been a longstanding difficulty in the artificial intelligence field.

2.3. Neural Networks for Image Compression

Existing neural networks for image compression methods can be classified in two categories, i.e., pixel probability modeling and auto-encoder. The former one belongs to the predictive coding strategy, while the latter one is the transform-based solution. Sometimes, these two methods are combined together in literature.

2.3.1 Pixel Probability Modeling

According to Shannon's information theory [6], the optimal method for lossless coding can reach the minimal coding rate—$\log_2 p(x)$ where p(x) is the probability of symbol x. A number of lossless coding methods were developed in literature and among them arithmetic coding is believed to be among the optimal ones. Given a probability distribution p(x), arithmetic coding ensures that the coding rate to be as close as possible to its theoretical limit—$\log_2 p(x)$ without considering the rounding error. Therefore, the remaining problem is to how to determine the probability, which is however very challenging for natural image/video due to the curse of dimensionality. Following the predictive coding strategy, one way to model p(x) is to predict pixel probabilities one by one in a raster scan order based on previous observations, where x is an image.

$$p(x) = p(x_1)p(x_2|x_1) \ldots p(x_i|x_1, \ldots , x_{i-1}) \ldots p(x_{m\times n}|x_1, \ldots , x_{m\times n-1}) \quad (1)$$

where m and n are the height and width of the image, respectively. The previous observation is also known as the context of the current pixel. When the image is large, it can be difficult to estimate the conditional probability, thereby a simplified method is to limit the range of its context.

$$p(x) = p(x_1)p(x_2|x_1)\dots p(x_i|x_{1-k}, \dots , x_{i-1})\dots p(x_{m\times n}|x_{m\times n-k}, \dots , x_{m\times n-1}) \quad (2)$$

where k is a pre-defined constant controlling the range of the context.

It should be noted that the condition may also take the sample values of other color components into consideration. For example, when coding the RGB color component, R sample is dependent on previously coded pixels (including R/G/B samples), the current G sample may be coded according to previously coded pixels and the current R sample, while for coding the current B sample, the previously coded pixels and the current R and G samples may also be taken into consideration.

Neural networks were originally introduced for computer vision tasks and have been proven to be effective in regression and classification problems. Therefore, it has been proposed using neural networks to estimate the probability of $p(x_i)$ given its context $x_1, x_2, \dots, x_{i-1}$. In an existing design, the pixel probability is proposed for binary images, i.e., $x_i\ \Sigma\ \{-1, +1\}$. The neural autoregressive distribution estimator (NADE) is designed for pixel probability modeling, where is a feed-forward network with a single hidden layer. A similar work is presented in another existing design, where the feed-forward network also has connections skipping the hidden layer, and the parameters are also shared. Experiments are performed on the binarized MNIST dataset. In an existing design, NADE is extended to a real-valued model RNADE, where the probability $p(x_i|x_1, \dots, x_{i-1})$ is derived with a mixture of Gaussians. Their feed-forward network also has a single hidden layer, but the hidden layer is with rescaling to avoid saturation and uses rectified linear unit (ReLU) instead of sigmoid. In an existing design, NADE and RNADE are improved by using reorganizing the order of the pixels and with deeper neural networks.

Designing advanced neural networks plays an important role in improving pixel probability modeling. In an existing design, multi-dimensional long short-term memory (LSTM) is proposed, which is working together with mixtures of conditional Gaussian scale mixtures for probability modeling. LSTM is a special kind of recurrent neural networks (RNNs) and is proven to be good at modeling sequential data. The spatial variant of LSTM is used for images later in an existing design. Several different neural networks are studied, including RNNs and CNNs namely PixelRNN and PixelCNN, respectively. In PixelRNN, two variants of LSTM, called row LSTM and diagonal BILSTM are proposed, where the latter is specifically designed for images. PixelRNN incorporates residual connections to help train deep neural networks with up to 12 layers. In PixelCNN, masked convolutions are used to suit for the shape of the context. Comparing with previous works, PixelRNN and PixelCNN are more dedicated to natural images: they consider pixels as discrete values (e.g., 0, 1, . . . , 255) and predict a multinomial distribution over the discrete values; they deal with color images in RGB color space; they work well on large-scale image dataset ImageNet. In an existing design, Gated PixelCNN is proposed to improve the PixelCNN, and achieves comparable performance with PixelRNN but with much less complexity. In an existing design, PixelCNN++ is proposed with the following improvements upon PixelCNN: a discretized logistic mixture likelihood is used rather than a 256-way multinomial distribution; down-sampling is used to capture structures at multiple resolutions; additional short-cut connections are introduced to speed up training; dropout is adopted for regularization; RGB is combined for one pixel. In an existing design, PixelSNAIL is proposed, in which casual convolutions are combined with self-attention.

Most of the above methods directly model the probability distribution in the pixel domain. Some researchers also attempt to model the probability distribution as a conditional one upon explicit or latent representations. That being said, the following is estimated:

$$p(x|h) = \prod_{i=1}^{m\times n} p(x_i|x_1, \dots , x_{i-1}, h) \quad (3)$$

where h is the additional condition and p(x)=p (h) p(x|h), meaning the modeling is split into an unconditional one and a conditional one. The additional condition can be image label information or high-level representations.

2.3.2 Auto-Encoder

Auto-encoder originates from the well-known work proposed in an existing design. The method is trained for dimensionality reduction and consists of two parts: encoding and decoding. The encoding part converts the high-dimension input signal to low-dimension representations, typically with reduced spatial size but a greater number of channels. The decoding part attempts to recover the high-dimension input from the low-dimension representation. Auto-encoder enables automated learning of representations and eliminates the need of hand-crafted features, which is also believed to be one of the most important advantages of neural networks.

Figure 2:
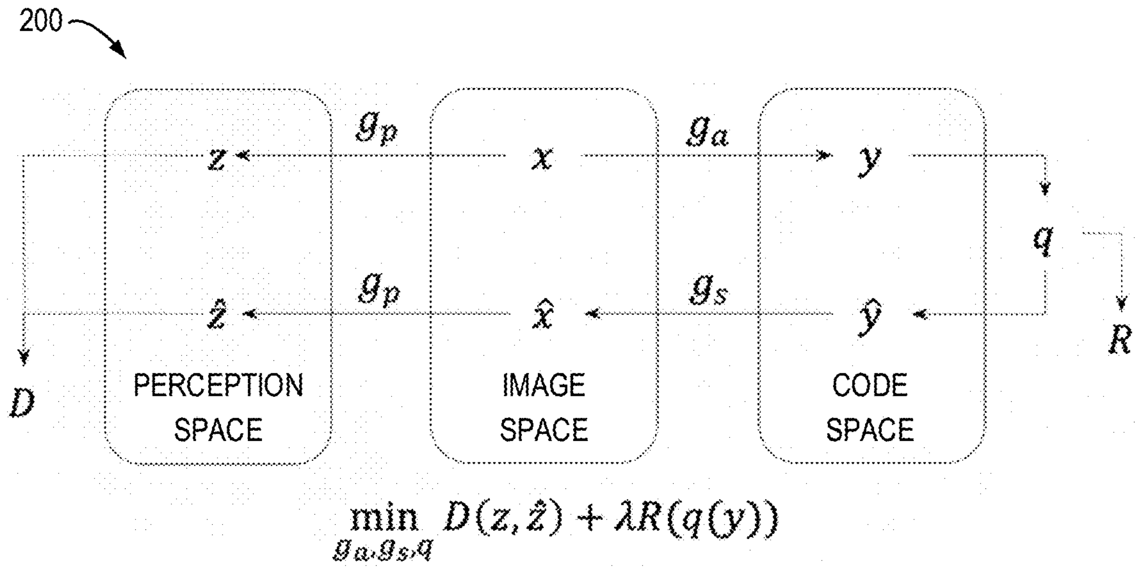
FIG. 2 illustrates a typical transform coding scheme.

FIG. 2 illustrates a typical transform coding scheme. The original image x is transformed by the analysis network $g_a$ to achieve the latent representation y. The latent representation y is quantized and compressed into bits. The number of bits R is used to measure the coding rate. The quantized latent representation $\hat{y}$ is then inversely transformed by a synthesis network $g_s$ to obtain the reconstructed image $\hat{x}$. The distortion is calculated in a perceptual space by transforming x and $\hat{x}$ with the function $g_p$.

It is intuitive to apply auto-encoder network to lossy image compression. Only the learned latent representation from the well-trained neural networks needs to be encoded. However, it is not trivial to adapt auto-encoder to image compression since the original auto-encoder is not optimized for compression thereby not efficient by directly using a trained auto-encoder. In addition, there exist other major challenges: First, the low-dimension representation should be quantized before being encoded, but the quantization is not differentiable, which is required in backpropagation while training the neural networks. Second, the objective under compression scenario is different since both the distortion and the rate need to be take into consideration. Estimating the rate is challenging. Third, a practical image coding scheme needs to support variable rate, scalability, encoding/decoding speed, interoperability. In response to these challenges, a number of researchers have been actively contributing to this area.

The prototype auto-encoder for image compression is in FIG. 2, which can be regarded as a transform coding strategy. The original image x is transformed with the analysis network $y=g_a(x)$, where y is the latent representation which will be quantized and coded. The synthesis network will inversely transform the quantized latent representation $\hat{y}$ back to obtain the reconstructed image $\hat{x}=g_s(\hat{y})$. The framework is trained with the rate-distortion loss function, i.e., $\mathcal{L}=D+\lambda R$, where D is the distortion between x and $\hat{x}$, R is the rate calculated or estimated from the quantized representation $\hat{y}$, and $\lambda$ is the Lagrange multiplier. It should be noted that D can be calculated in either pixel domain or perceptual domain. All existing research works follow this prototype and the difference might only be the network structure or loss function.

In terms of network structure, RNNs and CNNs are the most widely used architectures. In the RNNs relevant category, Toderici et al. propose a general framework for variable rate image compression using RNN. They use binary quantization to generate codes and do not consider rate during training. The framework indeed provides a scalable coding functionality, where RNN with convolutional and deconvolution layers is reported to perform decently. Toderici et al. then proposed an improved version by upgrading the encoder with a neural network similar to PixelRNN to compress the binary codes. The performance is reportedly better than JPEG on Kodak image dataset using MS-SSIM evaluation metric. Johnston et al. further improve the RNN-based solution by introducing hidden-state priming. In addition, an SSIM-weighted loss function is also designed, and spatially adaptive bitrates mechanism is enabled. They achieve better results than BPG on Kodak image dataset using MS-SSIM as evaluation metric. Covell et al. support spatially adaptive bitrates by training stop-code tolerant RNNs.

Ballé et al. proposes a general framework for rate-distortion optimized image compression. The use multiary quantization to generate integer codes and consider the rate during training, i.e. the loss is the joint rate-distortion cost, which can be MSE or others. They add random uniform noise to stimulate the quantization during training and use the differential entropy of the noisy codes as a proxy for the rate. They use generalized divisive normalization (GDN) as the network structure, which consists of a linear mapping followed by a nonlinear parametric normalization. The effectiveness of GDN on image coding is verified in an existing design. Ballé et al. then propose an improved version, where they use 3 convolutional layers each followed by a down-sampling layer and a GDN layer as the forward transform. Accordingly, they use 3 layers of inverse GDN each followed by an up-sampling layer and convolution layer to stimulate the inverse transform. In addition, an arithmetic coding method is devised to compress the integer codes. The performance is reportedly better than JPEG and JPEG 2000 on Kodak dataset in terms of MSE. Furthermore, Ballé et al. improve the method by devising a scale hyper-prior into the auto-encoder. They transform the latent representation y with a subnet $h_a$ to $z=h_a(y)$ and z will be quantized and transmitted as side information. Accordingly, the inverse transform is implemented with a subnet $h_s$ attempting to decode from the quantized side information $\hat{z}$ to the standard deviation of the quantized $\hat{y}$, which will be further used during the arithmetic coding of $\hat{y}$. On the Kodak image set, their method is slightly worse than BPG in terms of PSNR. D. Minnen et al. further exploit the structures in the residue space by introducing an autoregressive model to estimate both the standard deviation and the mean. In an existing design, Z. Cheng et al. use Gaussian mixture model to further remove redundancy in the residue. The reported performance is on par with VVC on the Kodak image set using PSNR as evaluation metric.

2.3.3 Hyper Prior Model

In the transform coding approach to image compression, the encoder subnetwork (section 2.3.2) transforms the image vector x using a parametric analysis transform $g_a(x, \emptyset_g)$ into a latent representation y, which is then quantized to form $\hat{y}$. Because $\hat{y}$ is discrete-valued, it can be losslessly compressed using entropy coding techniques such as arithmetic coding and transmitted as a sequence of bits.

Figure 3:
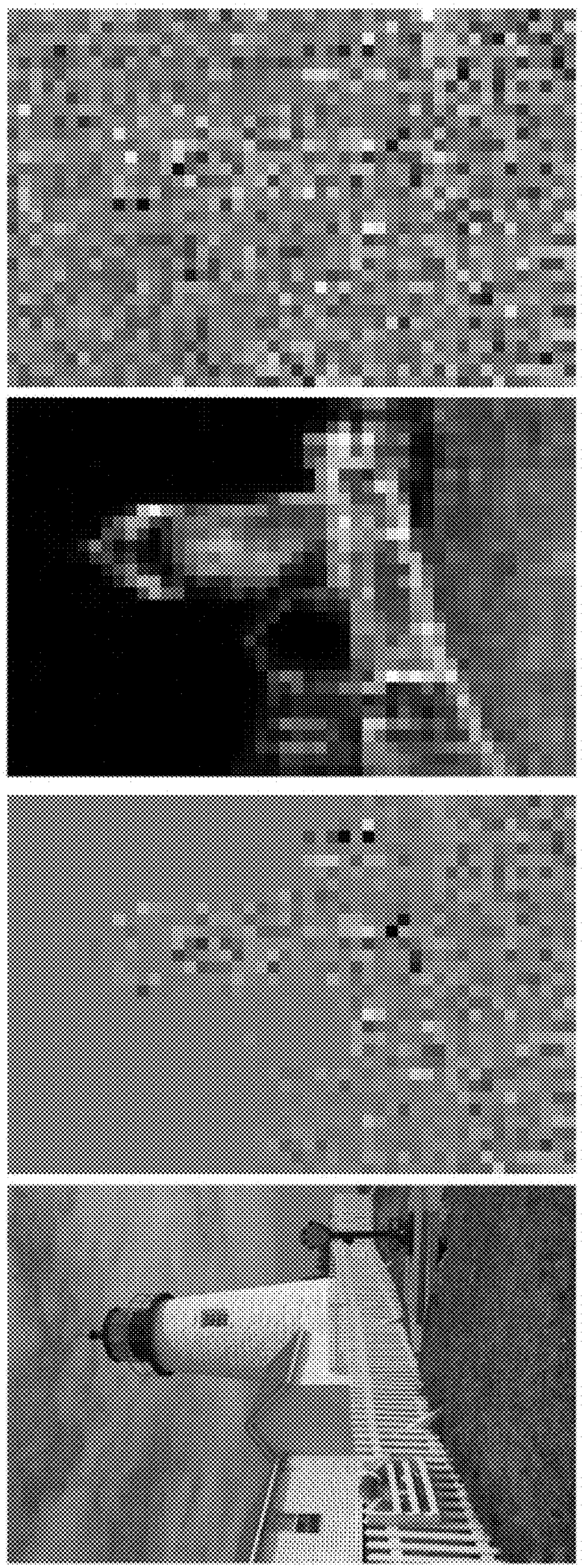
FIG. 3 illustrates an image from the Kodak dataset and different representations of the image.

As evident from the middle left and middle right image of FIG. 3, there are significant spatial dependencies among the elements of $\hat{y}$. Notably, their scales (middle right image) appear to be coupled spatially. In an existing design, an additional set of random variables $\hat{z}$ are introduced to capture the spatial dependencies and to further reduce the redundancies. In this case the image compression network is depicted in FIG. 4.

Figure 4:
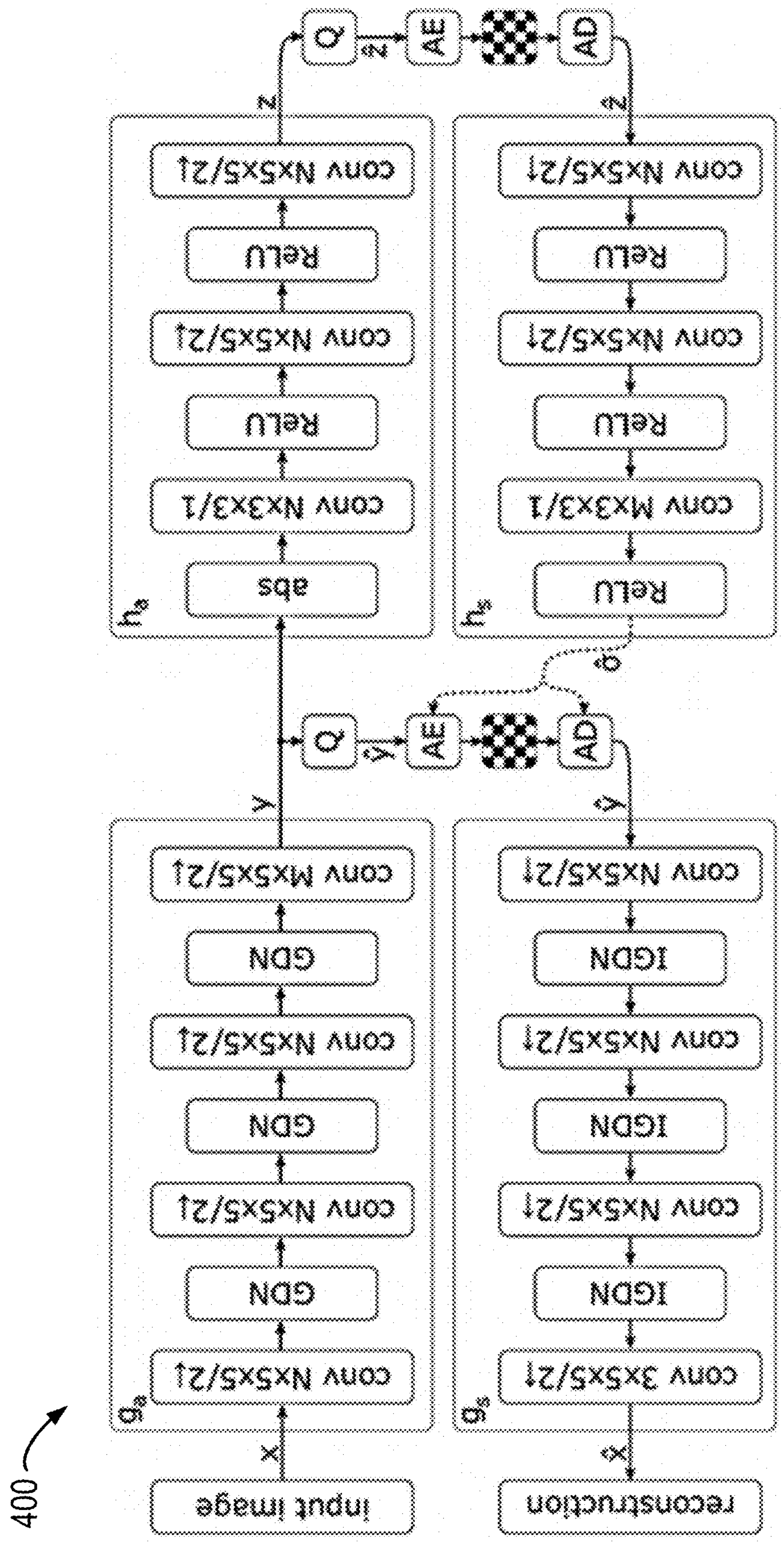
FIG. 4 illustrates a network architecture of an autoencoder implementing the hyperprior model.

In FIG. 4, the left hand of the models is the encoder $g_a$ and decoder $g_s$ (explained in section 2.3.2). The right-hand side is the additional hyper encoder $h_a$ and hyper decoder $h_s$ networks that are used to obtain $\hat{z}$. In this architecture the encoder subjects the input image x to $g_a$, yielding the responses y with spatially varying standard deviations. The responses y are fed into $h_a$, summarizing the distribution of standard deviations in z. z is then quantized ($\hat{z}$), compressed, and transmitted as side information. The encoder then uses the quantized vector $\hat{z}$ to estimate $\sigma$, the spatial distribution of standard deviations, and uses it to compress and transmit the quantized image representation $\hat{y}$. The decoder first recovers $\hat{z}$ from the compressed signal. It then uses $h_s$ to obtain $\sigma$, which provides it with the correct probability estimates to successfully recover $\hat{y}$ as well. It then feeds $\hat{y}$ into $g_s$ to obtain the reconstructed image.

When the hyper encoder and hyper decoder are added to the image compression network, the spatial redundancies of the quantized latent $\hat{y}$ are reduced. The rightmost image in FIG. 3 correspond to the quantized latent when hyper encoder/decoder are used. Compared to middle right image, the spatial redundancies are significantly reduced, as the samples of the quantized latent are less correlated.

FIG. 3 illustrates an image from the Kodak dataset and different representations of the image. The leftmost image in FIG. 3 shows an image from the Kodak dataset. The middle left image in FIG. 3 shows visualization of a latent representation y of that image. The middle right image in FIG. 3 shows standard deviations $\sigma$ of the latent. The rightmost image in FIG. 3 shows latents y after the hyper prior (hyper encoder and decoder) network is introduced.

FIG. 4 illustrates a network architecture of an autoencoder implementing the hyperprior model. The left side shows an image autoencoder network, the right side corresponds to the hyperprior subnetwork. The analysis and synthesis transforms are denoted as $g_a$ and $g_a$. Q represents quantization, and AE, AD represent arithmetic encoder and arithmetic decoder, respectively. The hyperprior model consists of two subnetworks, hyper encoder (denoted with $h_a$) and hyper decoder (denoted with $h_s$). The hyper prior model generates a quantized hyper latent ($\hat{z}$) which comprises information about the probability distribution of the samples of the quantized latent $\hat{y}$. $\hat{z}$ is included in the bitsteam and transmitted to the receiver (decoder) along with $\hat{y}$.

2.3.4 Context Model

Although the hyper prior model improves the modelling of the probability distribution of the quantized latent $\hat{y}$, additional improvement can be obtained by utilizing an autoregressive model that predicts quantized latents from their causal context (Context Model).

The term auto-regressive means that the output of a process is later used as input to it. For example the context model subnetwork generates one sample of a latent, which is later used as input to obtain the next sample.

An existing design utilizes a joint architecture where both hyper prior model subnetwork (hyper encoder and hyper decoder) and a context model subnetwork are utilized. The hyper prior and the context model are combined to learn a probabilistic model over quantized latents ŷ, which is then used for entropy coding. As depicted in FIG. 5, the outputs of context subnetwork and hyper decoder subnetwork are combined by the subnetwork called Entropy Parameters, which generates the mean μ and scale (or variance) σ parameters for a Gaussian probability model. The gaussian probability model is then used to encode the samples of the quantized latents into bitstream with the help of the arithmetic encoder (AE) module. In the decoder the gaussian probability model is utilized to obtain the quantized latents ŷ from the bitstream by arithmetic decoder (AD) module.

FIG. 5 illustrates a block diagram of a combined model. The combined model jointly optimizes an autoregressive component that estimates the probability distributions of latents from their causal context (Context Model) along with a hyperprior and the underlying autoencoder. Real-valued latent representations are quantized (Q) to create quantized latents (ŷ) and quantized hyper-latents (ẑ), which are compressed into a bitstream using an arithmetic encoder (AE) and decompressed by an arithmetic decoder (AD). The highlighted region corresponds to the components that are executed by the receiver (i.e. a decoder) to recover an image from a compressed bitstream.

Typically the latent samples are modeled as gaussian distribution or gaussian mixture models (not limited to). In the existing design and according to the FIG. 5, the context model and hyper prior are jointly used to estimate the probability distribution of the latent samples. Since a gaussian distribution can be defined by a mean and a variance (aka sigma or scale), the joint model is used to estimate the mean and variance (denoted as μ and σ).

2.3.5 the Encoding Process Using Joint Auto-Regressive Hyper Prior Model

The FIG. 5 corresponds to the state of the art compression method. In this section and the next, the encoding and decoding processes will be described separately.

Figure 6:
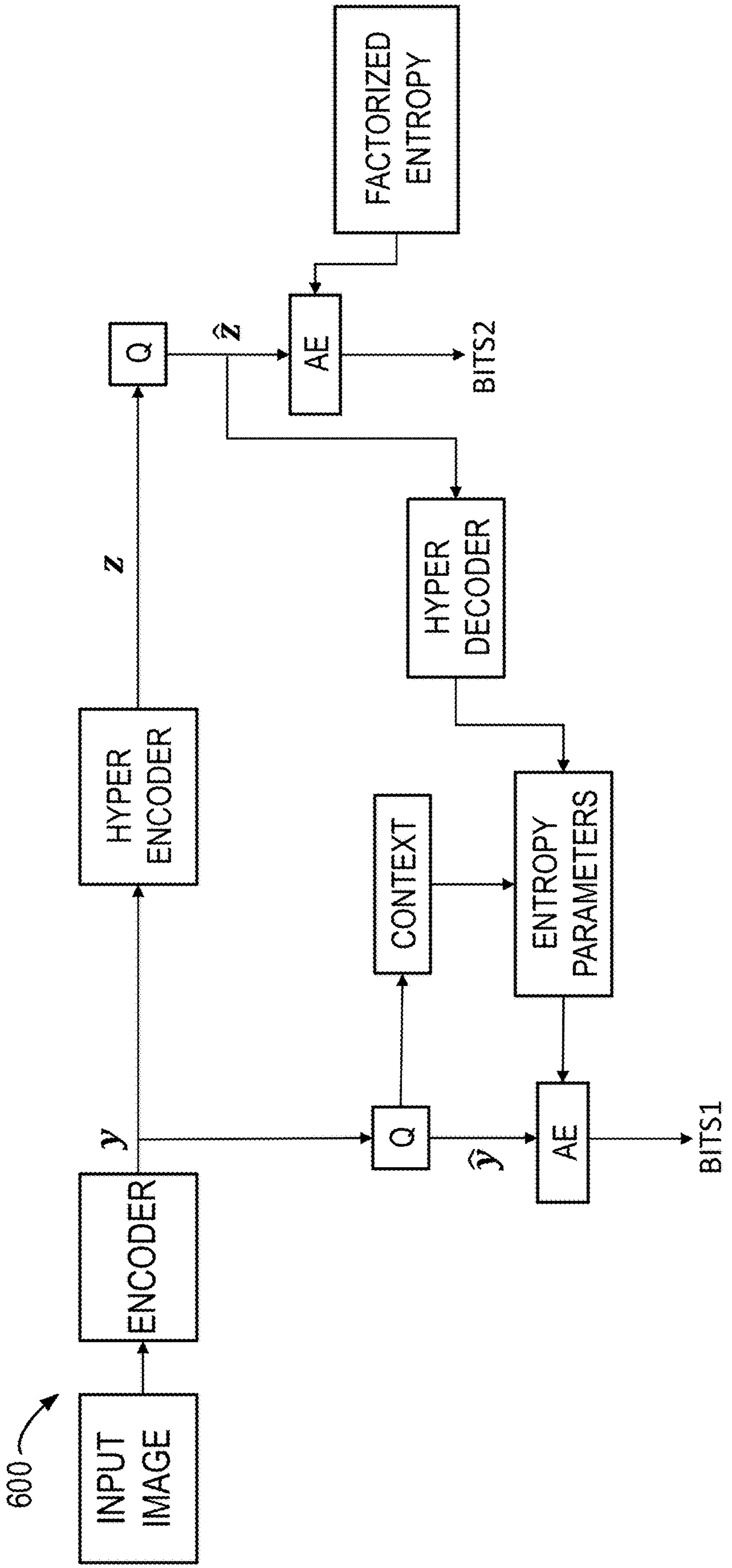
FIG. 6 illustrates an encoding process of the combined model.

The FIG. 6 depicts the encoding process. The input image is first processed with an encoder subnetwork. The encoder transforms the input image into a transformed representation called latent, denoted by y. y is then input to a quantizer block, denoted by Q, to obtain the quantized latent (ŷ). ŷ is then converted to a bitstream (bits1) using an arithmetic encoding module (denoted AE). The arithmetic encoding block converts each sample of the ŷ into a bitstream (bits1) one by one, in a sequential order. The modules hyper encoder, context, hyper decoder, and entropy parameters subnetworks are used to estimate the probability distributions of the samples of the quantized latent ŷ. the latent y is input to hyper encoder, which outputs the hyper latent (denoted by ẑ). The hyper latent is then quantized (ẑ) and a second bitstream (bits2) is generated using arithmetic encoding (AE) module. The factorized entropy module generates the probability distribution, that is used to encode the quantized hyper latent into bitstream. The quantized hyper latent includes information about the probability distribution of the quantized latent (ŷ).

The Entropy Parameters subnetwork generates the probability distribution estimations, that are used to encode the quantized latent ŷ. The information that is generated by the Entropy Parameters typically include a mean μ and scale (or variance) σ parameters, that are together used to obtain a gaussian probability distribution. A gaussian distribution of a random variable x is defined as $$f(x) = \frac{1}{\sigma\sqrt{2\pi}} e^{-\frac{1}{2}\left(\frac{x-\mu}{\sigma}\right)^2}$$

wherein the parameter μ is the mean or expectation of the distribution (and also its median and mode), while the parameter σ is its standard deviation (or variance, or scale). In order to define a gaussian distribution, the mean and the variance need to be determined. In the existing design, the entropy parameters module are used to estimate the mean and the variance values.

The subnetwork hyper decoder generates part of the information that is used by the entropy parameters subnetwork, the other part of the information is generated by the autoregressive module called context module. The context module generates information about the probability distribution of a sample of the quantized latent, using the samples that are already encoded by the arithmetic encoding (AE) module. The quantized latent ŷ is typically a matrix composed of many samples. The samples can be indicated using indices, such as ŷ[i,j,k] or ŷ[i,j] depending on the dimensions of the matrix ŷ. The samples ŷ[i,j] are encoded by AE one by one, typically using a raster scan order. In a raster scan order the rows of a matrix are processed from top to bottom, wherein the samples in a row are processed from left to right. In such a scenario (wherein the raster scan order is used by the AE to encode the samples into bitstream), the context module generates the information pertaining to a sample ŷ[i,j], using the samples encoded before, in raster scan order. The information generated by the context module and the hyper decoder are combined by the entropy parameters module to generate the probability distributions that are used to encode the quantized latent ŷ into bitstream (bits1). Finally the first and the second bitstream are transmitted to the decoder as result of the encoding process.

It is noted that the other names can be used for the modules described above.

In the above description, the all of the elements in FIG. 6 are collectively called encoder. The analysis transform that converts the input image into latent representation is also called an encoder (or auto-encoder).

2.3.6 the Decoding Process Using Joint Auto-Regressive Hyper Prior Model

Figure 7:
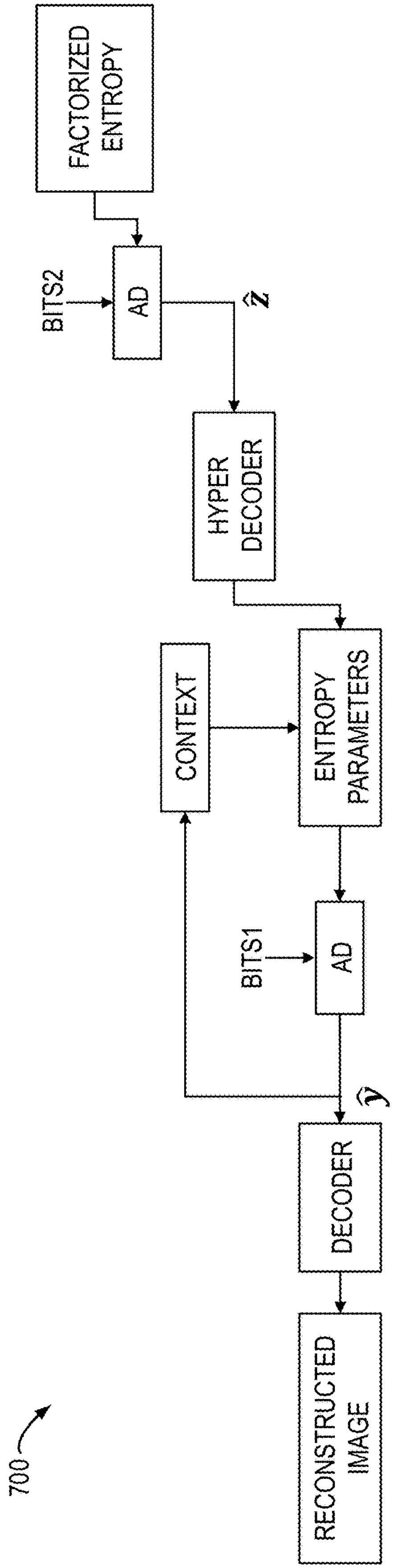
FIG. 7 illustrates a decoding process of the combined model.

The FIG. 7 depicts the decoding process separately. In the decoding process, the decoder first receives the first bitstream (bits1) and the second bitstream (bits2) that are generated by a corresponding encoder. The bits2 is first decoded by the arithmetic decoding (AD) module by utilizing the probability distributions generated by the factorized entropy subnetwork. The factorized entropy module typically generates the probability distributions using a predetermined template, for example using predetermined mean and variance values in the case of gaussian distribution. The output of the arithmetic decoding process of the bits2 is ẑ, which is the quantized hyper latent. The AD process reverts to AE process that was applied in the encoder. The processes of AE and AD are lossless, meaning that the quantized hyper latent ẑ that was generated by the encoder can be reconstructed at the decoder without any change.

After obtaining of ẑ, it is processed by the hyper decoder, whose output is fed to entropy parameters module. The three subnetworks, context, hyper decoder and entropy parameters that are employed in the decoder are identical to the ones in the encoder. Therefore the exact same probability distributions can be obtained in the decoder (as in encoder), which is essential for reconstructing the quantized latent ŷ without any loss. As a result the identical version of the quantized latent ŷ that was obtained in the encoder can be obtained in the decoder.

After the probability distributions (e.g. the mean and variance parameters) are obtained by the entropy parameters subnetwork, the arithmetic decoding module decodes the samples of the quantized latent one by one from the bitstream bits1. From a practical standpoint, autoregressive model (the context model) is inherently serial, and therefore cannot be sped up using techniques such as parallelization. Finally the fully reconstructed quantized latent ŷ is input to the synthesis transform (denoted as decoder in FIG. 7) module to obtain the reconstructed image.

In the above description, the all of the elements in FIG. 7 are collectively called decoder. The synthesis transform that converts the quantized latent into reconstructed image is also called a decoder (or auto-decoder).

2.4. Neural Networks for Video Compression

Similar to conventional video coding technologies, neural image compression serves as the foundation of intra compression in neural network-based video compression, thus development of neural network-based video compression technology comes later than neural network-based image compression but needs far more efforts to solve the challenges due to its complexity. Starting from 2017, a few researchers have been working on neural network-based video compression schemes. Compared with image compression, video compression needs efficient methods to remove inter-picture redundancy. Inter-picture prediction is then a crucial step in these works. Motion estimation and compensation is widely adopted but is not implemented by trained neural networks until recently.

Studies on neural network-based video compression can be divided into two categories according to the targeted scenarios: random access and the low-latency. In random access case, it requires the decoding can be started from any point of the sequence, typically divides the entire sequence into multiple individual segments and each segment can be decoded independently. In low-latency case, it aims at reducing decoding time thereby usually merely temporally previous frames can be used as reference frames to decode subsequent frames.

2.4.1 Low-Latency

Chen et al. are the first to propose a video compression scheme with trained neural networks. They first split the video sequence frames into blocks and each block will choose one from two available modes, either intra coding or inter coding. If intra coding is selected, there is an associated auto-encoder to compress the block. If inter coding is selected, motion estimation and compensation are performed with tradition methods and a trained neural network will be used for residue compression. The outputs of auto-encoders are directly quantized and coded by the Huffman method.

Chen et al. propose another neural network-based video coding scheme with PixelMotionCNN. The frames are compressed in the temporal order, and each frame is split into blocks which are compressed in the raster scan order. Each frame will firstly be extrapolated with the preceding two reconstructed frames. When a block is to be compressed, the extrapolated frame along with the context of the current block are fed into the PixelMotionCNN to derive a latent representation. Then the residues are compressed by the variable rate image scheme. This scheme performs on par with H.264.

Lu et al. propose the real-sense end-to-end neural network-based video compression framework, in which all the modules are implemented with neural networks. The scheme accepts current frame and the prior reconstructed frame as inputs and optical flow will be derived with a pre-trained neural network as the motion information. The motion information will be warped with the reference frame followed by a neural network generating the motion compensated frame. The residues and the motion information are compressed with two separate neural auto-encoders. The whole framework is trained with a single rate-distortion loss function. It achieves better performance than H.264.

Rippel et al. propose an advanced neural network-based video compression scheme. It inherits and extends traditional video coding schemes with neural networks with the following major features: 1) using only one auto-encoder to compress motion information and residues; 2) motion compensation with multiple frames and multiple optical flows; 3) an on-line state is learned and propagated through the following frames over time. This scheme achieves better performance in MS-SSIM than HEVC reference software.

J. Lin et al. propose an extended end-to-end neural network-based video compression framework. In this solution, multiple frames are used as references. It is thereby able to provide more accurate prediction of current frame by using multiple reference frames and associated motion information. In addition, motion field prediction is deployed to remove motion redundancy along temporal channel. Post-processing networks are also introduced in this work to remove reconstruction artifacts from previous processes. The performance is better than H.265 by a noticeable margin in terms of both PSNR and MS-SSIM.

Eirikur et al. propose scale-space flow to replace commonly used optical flow by adding a scale parameter. It is reportedly achieving better performance than H.264.

Z. Hu et al. propose a multi-resolution representation for optical flows. Concretely, the motion estimation network produces multiple optical flows with different resolutions and let the network to learn which one to choose under the loss function. The performance is slightly improved and better than H.265.

2.4.2 Random Access

Wu et al. propose a neural network-based video compression scheme with frame interpolation. The key frames are first compressed with a neural image compressor and the remaining frames are compressed in a hierarchical order. They perform motion compensation in the perceptual domain, i.e. deriving the feature maps at multiple spatial scales of the original frame and using motion to warp the feature maps, which will be used for the image compressor. The method is reportedly on par with H.264.

Djelouah et al. propose a method for interpolation-based video compression, wherein the interpolation model combines motion information compression and image synthesis, and the same auto-encoder is used for image and residual.

Amirhossein et al. propose a neural network-based video compression method based on variational auto-encoders with a deterministic encoder. Concretely, the model consists of an auto-encoder and an auto-regressive prior. Different from previous methods, this method accepts a group of pictures (GOP) as inputs and incorporates a 3D autoregressive prior by taking into account of the temporal correlation while coding the laten representations. It provides comparative performance as H.265.

2.5. Preliminaries

Almost all the natural image/video is in digital format. A grayscale digital image can be represented by $x \in \mathbb{D}^{m \times n}$, where $\mathbb{D}$ is the set of values of a pixel, m is the image height and n is the image width. For example, $\mathbb{D}=\{0, 1, 2, \ldots, 255\}$ is a common setting and in this case $|\mathbb{D}|=256=2^8$, thus the pixel can be represented by an 8-bit integer. An uncompressed grayscale digital image has 8 bits-per-pixel (bpp), while compressed bits are definitely less.

A color image is typically represented in multiple channels to record the color information. For example, in the RGB color space an image can be denoted by $x \in \mathbb{D}^{m \times n \times 3}$ with three separate channels storing Red, Green and Blue information. Similar to the 8-bit grayscale image, an uncompressed 8-bit RGB image has 24 bpp. Digital images/videos can be represented in different color spaces. The neural network-based video compression schemes are mostly developed in RGB color space while the traditional codecs typically use YUV color space to represent the video sequences. In YUV color space, an image is decomposed into three channels, namely Y, Cb and Cr, where Y is the luminance component and Cb/Cr are the chroma components. The benefits come from that Cb and Cr are typically down sampled to achieve pre-compression since human vision system is less sensitive to chroma components.

A color video sequence is composed of multiple color images, called frames, to record scenes at different timestamps. For example, in the RGB color space, a color video can be denoted by $X=\{x_0, x_1, \ldots, x_t, \ldots, x_{T-1}\}$ where T is the number of frames in this video sequence, $x \in \mathbb{D}^{m \times n}$. If m=1080, n=1920, $|\mathbb{D}|=2^8$, and the video has 50 frames-per-second (fps), then the data rate of this uncompressed video is 1920×1080×8×3×50=2,488,320,000 bits-per-second (bps), about 2.32 Gbps, which needs a lot storage thereby definitely needs to be compressed before transmission over the internet.

Usually the lossless methods can achieve compression ratio of about 1.5 to 3 for natural images, which is clearly below requirement. Therefore, lossy compression is developed to achieve further compression ratio, but at the cost of incurred distortion. The distortion can be measured by calculating the average squared difference between the original image and the reconstructed image, i.e., mean-squared-error (MSE). For a grayscale image, MSE can be calculated with the following equation.

$$MSE = \frac{\|x - \hat{x}\|^2}{m \times n} \quad (4)$$

Accordingly, the quality of the reconstructed image compared with the original image can be measured by peak signal-to-noise ratio (PSNR):

$$PSNR = 10 \times \log_{10} \frac{(\max(\mathbb{D}))^2}{MSE} \quad (5)$$

where max ($\mathbb{D}$) is the maximal value in $\mathbb{D}$, e.g., 255 for 8-bit grayscale images. There are other quality evaluation metrics such as structural similarity (SSIM) and multi-scale SSIM (MS-SSIM).

To compare different lossless compression schemes, it is sufficient to compare either the compression ratio given the resulting rate or vice versa. However, to compare different lossy compression methods, it has to take into account both the rate and reconstructed quality. For example, to calculate the relative rates at several different quality levels, and then to average the rates, is a commonly adopted method; the average relative rate is known as Bjontegaard's delta-rate (BD-rate). There are other important aspects to evaluate image/video coding schemes, including encoding/decoding complexity, scalability, robustness, and so on.

3. Problems 3.1. The Core Problem

The state of the art image compression networks include an autoregressive model (for example the context model) to improve the compression performance. However autoregressive model is interleaved with the inherently serial entropy decoding process, as a result the decoding process becomes inherently serial (cannot be efficiently parallelized) and very slow.

Figure 8:
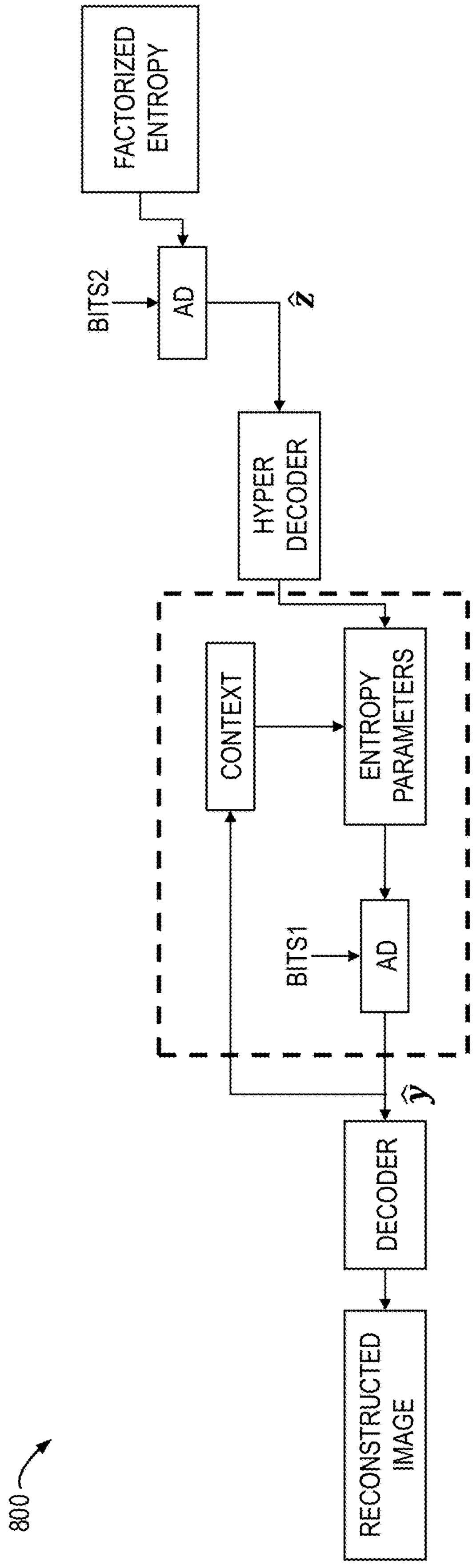
FIG. 8 illustrates the problem in the decoder network.

FIG. 8 illustrates the problem in the decoder network. The problem is highlighted in the dashed box. The problem pertains to the entropy decoding part of the state-of-the-art image decoding architecture. The FIG. 8 above depicts the state-of-the-art decoder design. The modules on the right hand side, that are encapsulated in the dashed rectangle are responsible for entropy decoding of the quantized latent $\hat{y}$. This part is very slow in state of the art architectures due to their serial nature.

3.2. Details of the Problem

Figure 9:
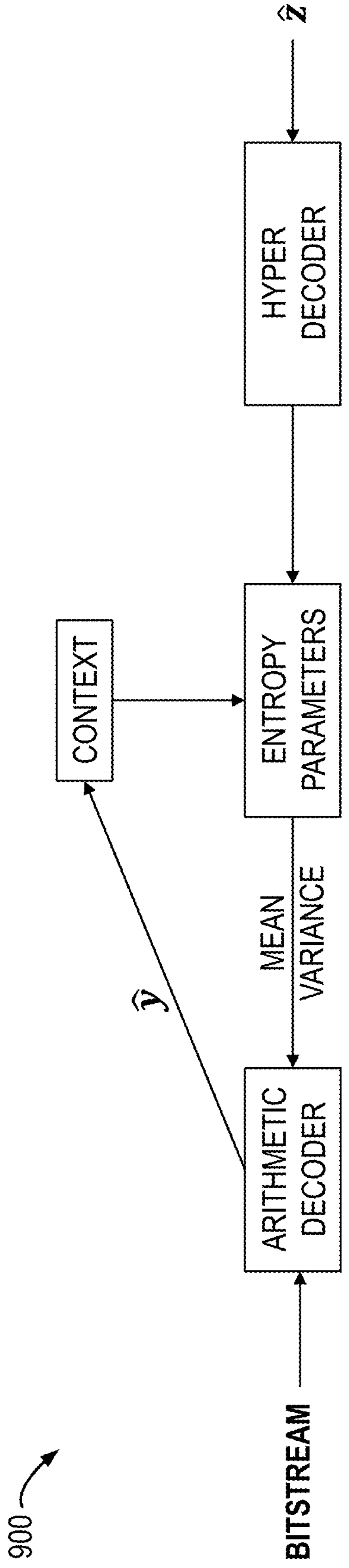
FIG. 9 illustrates entropy coding subnetwork in the state-of-the-art image decoding architecture.

FIG. 9 illustrates entropy coding subnetwork in the state-of-the-art image decoding architecture. In the state-of-the-art image decoding architecture, the process of reconstructing the quantized latent $\hat{y}$ is performed as follows:

1. The quantized hyper latent $\hat{z}$ is processed by hyper decoder to generate a first partial information. The first partial information is fed to entropy parameters module.
2. The following operation is performed serially and in a recursive manner to reconstruct a sample of the quantized latent $\hat{y}[i, j]$:
   a. The context module generates second partial information using the samples $\hat{y}$ [m, n], wherein
      i. n<j, or
      ii. m<i if n is equal to j.
      (The samples located at [m, n] are the ones that are already reconstructed.)
   b. Using the first and the second partial information, the Entropy parameter module generates the $\mu[i, j]$ and $\sigma[i, j]$, which are the mean and variance of gaussian probability distribution.
   c. Arithmetic decoder decodes the sample $\hat{y}[i, j]$ from the bitstream using the probability distribution, whose mean and variance are $\mu[i, j]$ and $\sigma[i, j]$ After the quantized latent $\hat{y}$ is reconstructed according to the above flow chart, it is processed by a synthesis transform (the decoder) to obtain the reconstructed picture. The synthesis transform is called decoder according to the notation used in FIG. 7. The whole process described above (that includes reconstruction of the $\hat{y}$ and reconstruction of the image) is also called decoding or a decoder.

In the above a sample of quantized latent is denoted by $\hat{y}[i, j]$. It is noted that the sample is not necessarily a scalar value, it might be a vector and might contain multiple elements. In the rest of the application a sample can be denoted by $\hat{y}[i, j]$ or $\hat{y}[:, i, j]$. In the latter, the ":" is used to denote that there is a third dimension and is used to stress that the sample has multiple elements.

After the samples of the quantized latent $\hat{y}$ are reconstructed, the synthesis transform (i.e. decoder) is performed to obtain the reconstructed image.

As it is apparent from the above description, the arithmetic decoding operation and the Context module operation form a fully serial operation for the decoding of $\hat{y}[i, j]$. This means that the samples of $\hat{y}$ cannot be reconstructed in parallel, they need to be reconstructed one after the other.

The arithmetic decoding process (not limited to arithmetic coding, includes most of the other entropy coding methods such as range coding), is an operation that is computationally simple but inherently sequential. The reason is that, the bitstream consists of series of bits, and the bits need to be decoded one by one. This process is suitable to be performed by a processing unit that is fast, like a CPU.

On the other hand the Context and Entropy Parameters modules are computationally intensive and highly parallelizable operations. They are more suitable to be performed by a processing unit that is massively parallel, like a GPU.

The problem arises in the state-of-the-art image coding architectures, when the context and entropy parameters modules are interleaved with the arithmetic decoding. As described in the flowchart above, the decoding of one sample of $\hat{y}$ requires application of context module, entropy parameters module followed by the arithmetic decoding module. The context module and entropy parameters modules are deep neural networks, which means that they include huge amount of operations. The arithmetic decoding is a relatively simple operation, however it is fully serial. Performing the fully serial arithmetic decoding operation interleaved with the complex "context" and "entropy parameters" operations slows down the decoding process significantly.

As a first example, if the processes of context, arithmetic decoding and entropy parameters modules are performed in a GPU the following happens:

1. First a sample of quantized latent is obtained using the arithmetic decoding. Since arithmetic decoding is fully serial, only a single core of the GPU is utilized. During this time all of the other GPU cores (there can be thousand cores in a GPU), will be waiting idle. Furthermore each core of the GPU is slow, since they are not designed to perform computations fast.
2. Once a sample of the quantized latent is obtained, the context and entropy parameters modules are performed utilizing multiple cores of the GPU. This second step can be performed efficiently, since the context and entropy parameters modules are suitable for massive parallelization, hence suitable to be performed at a GPU.
3. Go to step 1 till all samples of the quantized latent are decoded.

Once can understand that the source of slow-down is step 1 when the decoding is performed on a GPU.

As a second example, if the processes of context, arithmetic decoding and entropy parameters modules are performed on a CPU the following happens:

1. First a sample of quantized latent is obtained using the arithmetic decoding. Since arithmetic decoding is fully serial, the CPU is very suitable, therefore the sample is obtained very quickly.
2. Once a sample of the quantized latent is obtained, the context and entropy parameters modules are performed. However the CPU is not suitable for performing huge number of operations, it only includes several processing cores. Therefore this step will be very slow.
3. Go to step 1 till all samples of the latent are decoded.

When the process is performed on a CPU, the slow-down is caused by step 2, which is not suitable to be performed on a CPU.

Finally as a third example, one can think about performing part of decoding on CPU (arithmetic decoding) and part on GPU (context and entropy parameters). In this case the following happens:

1. First a sample of latent is obtained using the arithmetic decoding. Since arithmetic decoding is fully serial, the CPU is very suitable, therefore the sample is obtained very quickly. During this time GPU is staying idle.
2. The obtained data is transferred to GPU.
3. Once a sample of the latent is obtained, the context and entropy parameters modules are performed utilizing multiple cores of the GPU. This second step can be performed efficiently, since the context and entropy parameters modules are suitable for massive parallelization, hence suitable to be performed at a GPU. During this time CPU is staying idle.
4. The obtained data (mean and variance values) are sent to CPU.
5. Go to step 1 till all samples of the latent are decoded.

As one can understand, using CPU and GPU in tandem is also not viable due to the idle CPU and GPU times, as well as the times necessary for transferring data back and forth between CPU and GPU. In fact this is the slowest implementation among the 3 options.

In short, the problem arises when computationally complex but massively parallelizable process (such as a deep neural network, e.g. context module or entropy parameters module), needs to be performed in an interleaved fashion with an entropy coding process (such as arithmetic coding or range coding) that is simple but fully serial. The state-of-the-art image coding networks suffer from this problem, hence the decoding process is very slow in this architecture.

A straightforward solution to the above described problem would be to remove the auto-regressive "context" module, as a result the loop comprising the arithmetic decoder, context and entropy parameters module could be eliminated. However this would result in considerable amount of degradation in compression efficiency. The proposed solution achieves the same result as the straightforward solution without sacrificing the compression efficiency.

4. Detailed Solutions

The detailed solutions below should be considered as examples to explain general concepts. These solutions should not be interpreted in a narrow way. Furthermore, these solutions can be combined in any manner.

4.1. Target of the Solution

The target of the solution is to de-interleave the arithmetic decoding process and the computationally complex deep neural network operations. In other words, the target of the solution is to decouple the arithmetic decoding process from the neural network-based modules. Therefore the arithmetic decoding process can be completed independently, without requiring input from neural network based processes. As a result, the speed of decoding is increased significantly.

4.2. Core of the Solution

4.2.1 Decoding Process

Figure 10:
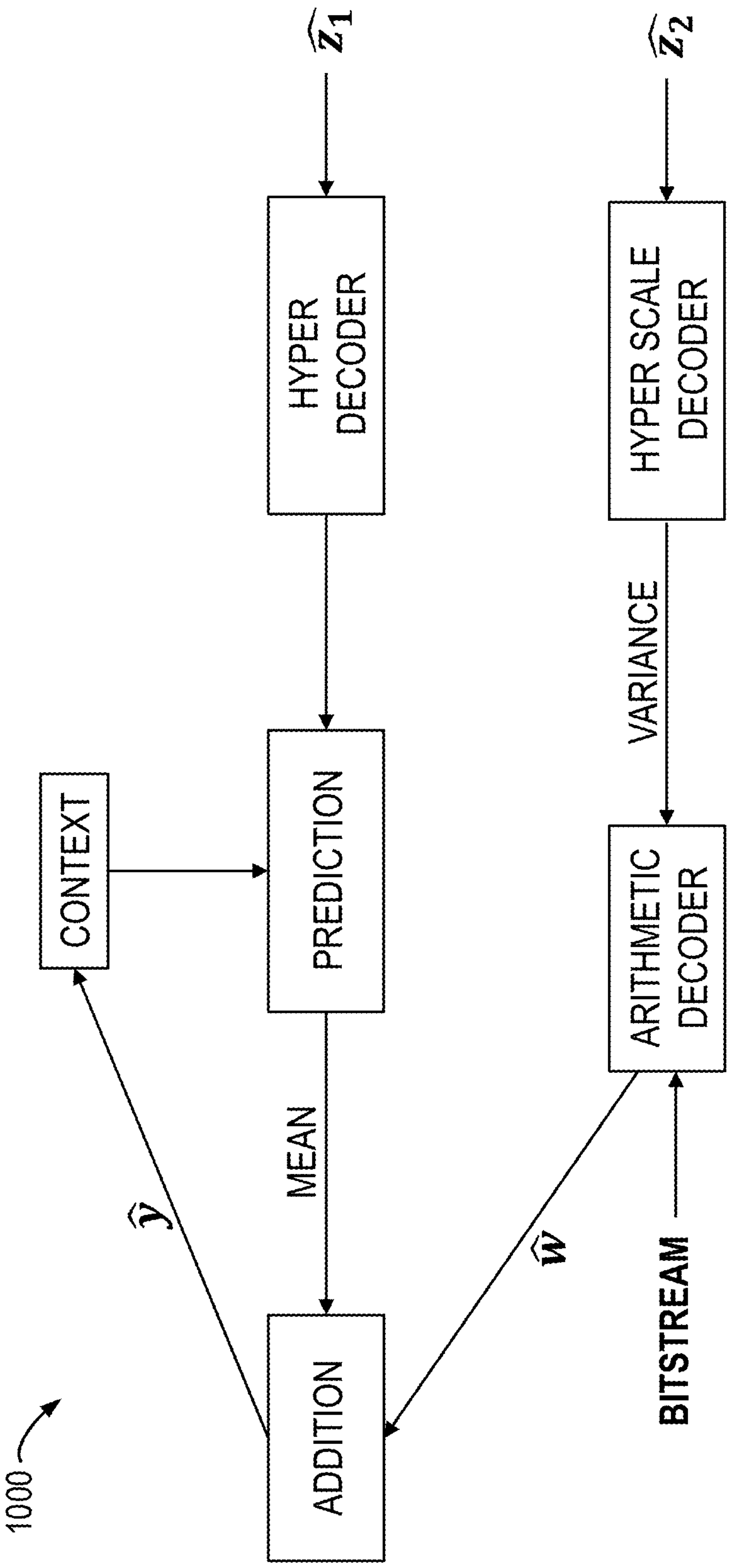
FIG. 10 illustrates a decoding process according to some embodiments of the present disclosure.

FIG. 10 illustrates the decoding process according to some embodiments of the present disclosure. According to the solution, the decoding operation is performed as follows:

1. Firstly, a second subnetwork is used to estimate probability parameters using a quantized hyper latent ($\widehat{z_2}$ in FIG. 10 above).
2. The probability parameters (e.g. variance) generated by the second network are used to generate a quantized residual latent (denoted ŵ in FIG. 10) by performing the arithmetic decoding process. The arithmetic decoder decodes the received bitstream based on the said probability parameters and generates the ŵ.
3. The following steps are performed in a loop until all elements of ŷ are obtained:
   a. A first subnetwork is used to estimate a mean value parameter of a quantized latent (ŷ), using the already obtained samples of ŷ.
   b. The quantized residual latent ŵ and the mean value are used to obtain the next element of ŷ.
4. After all of the samples of ŷ are obtained, a synthesis transform, such as the decoder module in FIG. 8 can be applied to obtain the reconstructed image.

An exemplary implementation of the solution is depicted in the FIG. 10 above (the decoding process). In FIG. 10, the first subnetwork comprises the context, prediction and optionally the hyper decoder modules. The second network comprises the hyper scale decoder module. The quantized hyper latent is $\widehat{z_2}$. Compared to the state of the art (FIG. 8), the arithmetic decoding process is removed from the loop comprised of arithmetic decoding, context and entropy parameters. Instead, according to the solution the arithmetic decoding process is performed without using any input from context and entropy parameters module, therefore it can be performed independently (it is deinterleaved). According to the solution the arithmetic decoding module has two inputs, the bitstream and the probability parameters (e.g. variance) which are the output of the hyper scale decoder. The hyper scale decoder generates the probability parameters using the quantized hyper latent $\widehat{z_2}$. The arithmetic decoding process generates the quantized residual latent ŵ.

After the residual latent is obtained, a recursive prediction operation is performed to obtain the latent ŷ. The samples of latent ŷ[:, i, j] are obtained as follows:

1. An autoregressive context module is used to generate first input of a prediction module using the samples ŷ [:, m, n] where the (m, n) pair are the indices of the samples of the latent that are already obtained.
2. Optionally the second input of the prediction module is obtained by using a hyper decoder and a quantized hyper latent $\widehat{z_1}$.
3. Using the first input and the second input, the prediction module generates the mean value mean [:, i, j].
4. The mean value mean [:, i, j] and the quantized residual latent ŵ[:, i, j] are added together to obtain the latent ŷ[:, i, j].
5. The steps 1-4 are repeated for the next sample.

Figure 11:
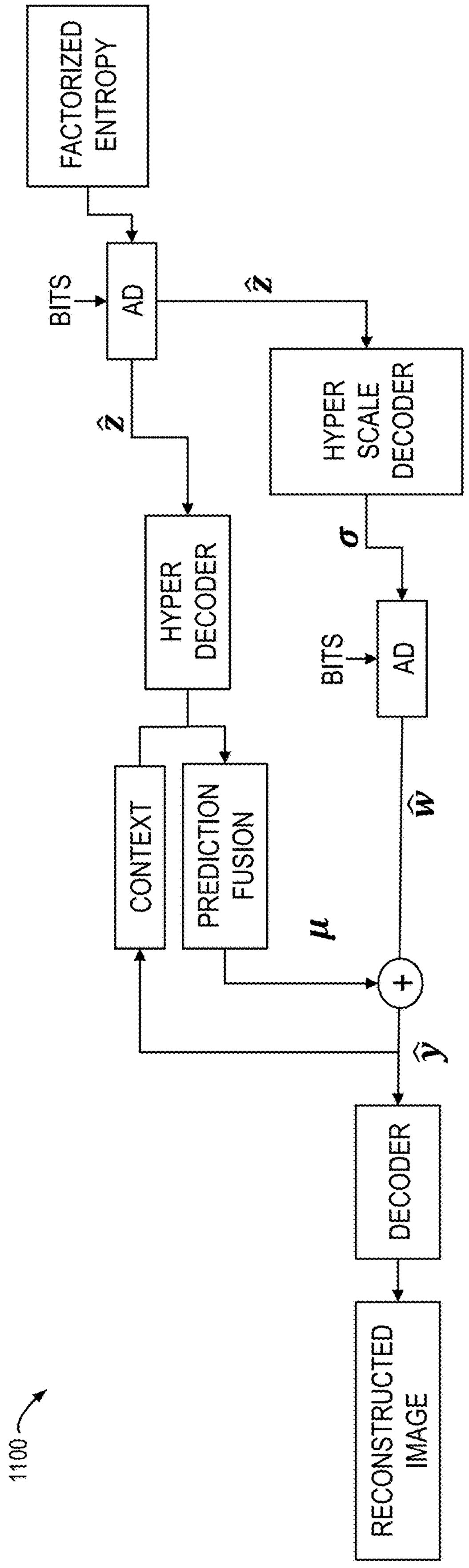
FIG. 11 illustrates another decoding process according to some embodiments of the present disclosure.

The FIG. 11 depicts another exemplary implementation of the solution. Compared to the FIG. 10, in FIG. 11 the same quantized hyper latent is used as input to the hyper decoder and hyper scale decoder modules. The rest of the operations are same as explained above.

4.2.2 Encoding Process

Figure 12:
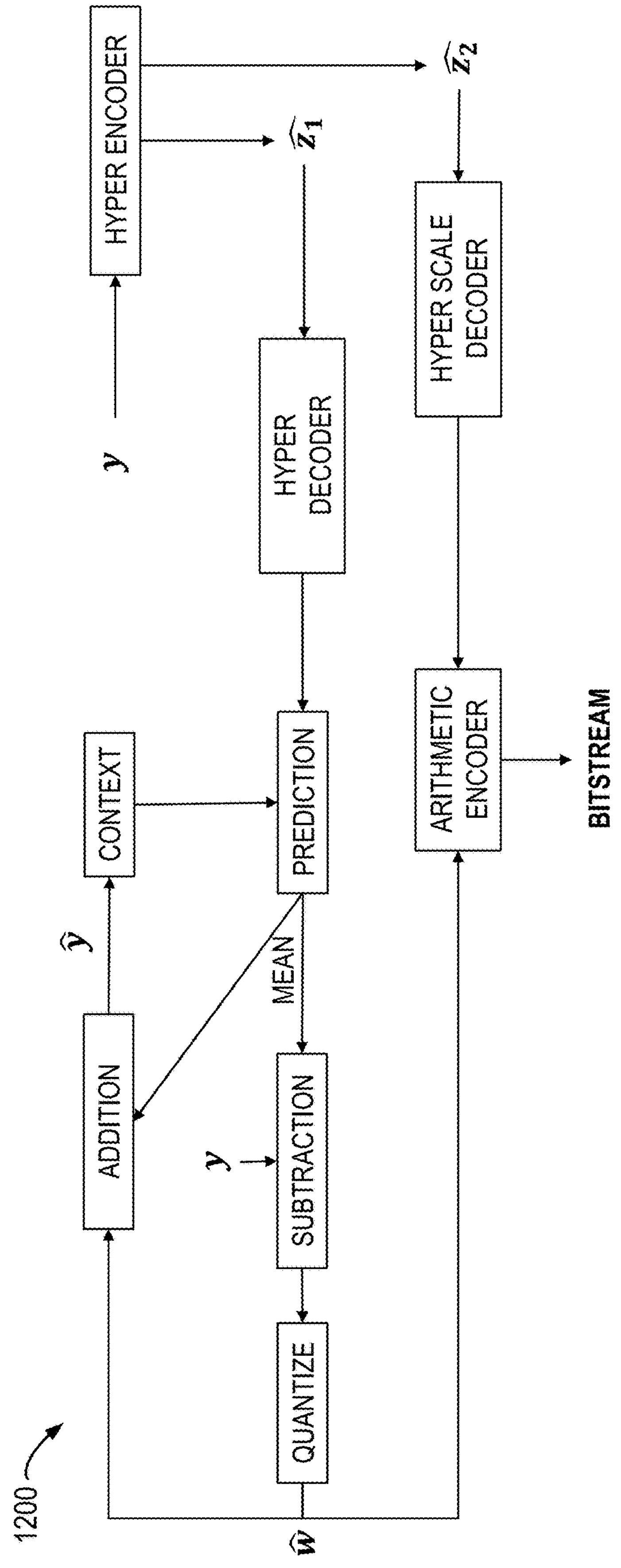
FIG. 12 illustrates an encoding process according to some embodiments of the present disclosure.

FIG. 12 illustrates an encoding process according to some embodiments of the present disclosure. According to the solution, the encoding operation is performed as follows:

Initially an analysis transform, such as the encoder in FIG. 6 is applied to obtain all samples of the latent y.

1. First, the following steps are performed in a loop until all elements of quantized residual latent ŵ are obtained:
   a. A first subnetwork is used to estimate a mean value parameter of the latent y, using the already obtained samples of quantized latent ŷ.
   b. The mean value is subtracted from y to obtain the residual w, which is quantized to obtain quantized residual latent ŵ.
   c. ŵ is added to the mean value are added to obtain the quantized latent ŷ.
2. Secondly, a second subnetwork is used to estimate probability parameters (e.g. variance) using a quantized hyper latent ẑ.
3. The probability parameters are used by the entropy encoder module to encode elements of the quantized residual latent into the bitstream.

An exemplary implementation of the solution is depicted in the FIG. 12 above (the encoding process). In FIG. 12, the first subnetwork comprises the context, prediction and optionally hyper decoder modules. The second network comprises the hyper scale decoder module. Compared to the state of the art (FIG. 6), the arithmetic encoding process is removed from the loop comprised of arithmetic encoding, context and entropy parameters. Instead according to the solution the arithmetic encoding process is performed without using any input from context and entropy parameters module, therefore it can be performed independently (it is deinterleaved). According to the solution the arithmetic encoding module has two inputs, the quantized residual latent and the probability parameters (e.g. variance) which are the output of the hyper scale decoder. The arithmetic encoding process uses a probability model that has a mean of zero. The hyper scale decoder generates the probability parameters using the hyper latent $\widehat{z_2}$. The arithmetic encoding process generates the bitstream that is transmitted to the decoder.

The samples of the quantized residual latent ŵ[:, i, j] are obtained according to a recursive prediction operation as follows:

1. An autoregressive context module is used to generate first input of a prediction module using the samples ŷ [:, m, n] where the (m, n) pair are the indices of the samples of the latent that are already obtained.
2. Optionally the second input of the prediction module is obtained by using a hyper decoder and a hyper latent $\widehat{z_1}$.
3. Using the first input and the second input, the prediction module generates the mean value mean [:, i, j].
4. The mean value mean [:, i, j] is subtracted from the latent y [:, i, j] to obtain the residual latent w [:, i, j].
5. Residual latent is quantized to obtain quantized residual latent ŵ[:, i, j].
6. ŵ[:, i, j] is added to mean [:, i, j] to obtain the next sample of the quantized latent ŷ [:, i, j].

The steps 1-5 are repeated for the next sample.

Once all of the samples of the quantized residual latent w are obtained according to the recursive process above, the entropy encoding process is applied to convert w to bitstream. A second subnetwork (hyper scale decoder) is used to estimate the probability parameters that are used in the entropy encoding process.

Figure 13:
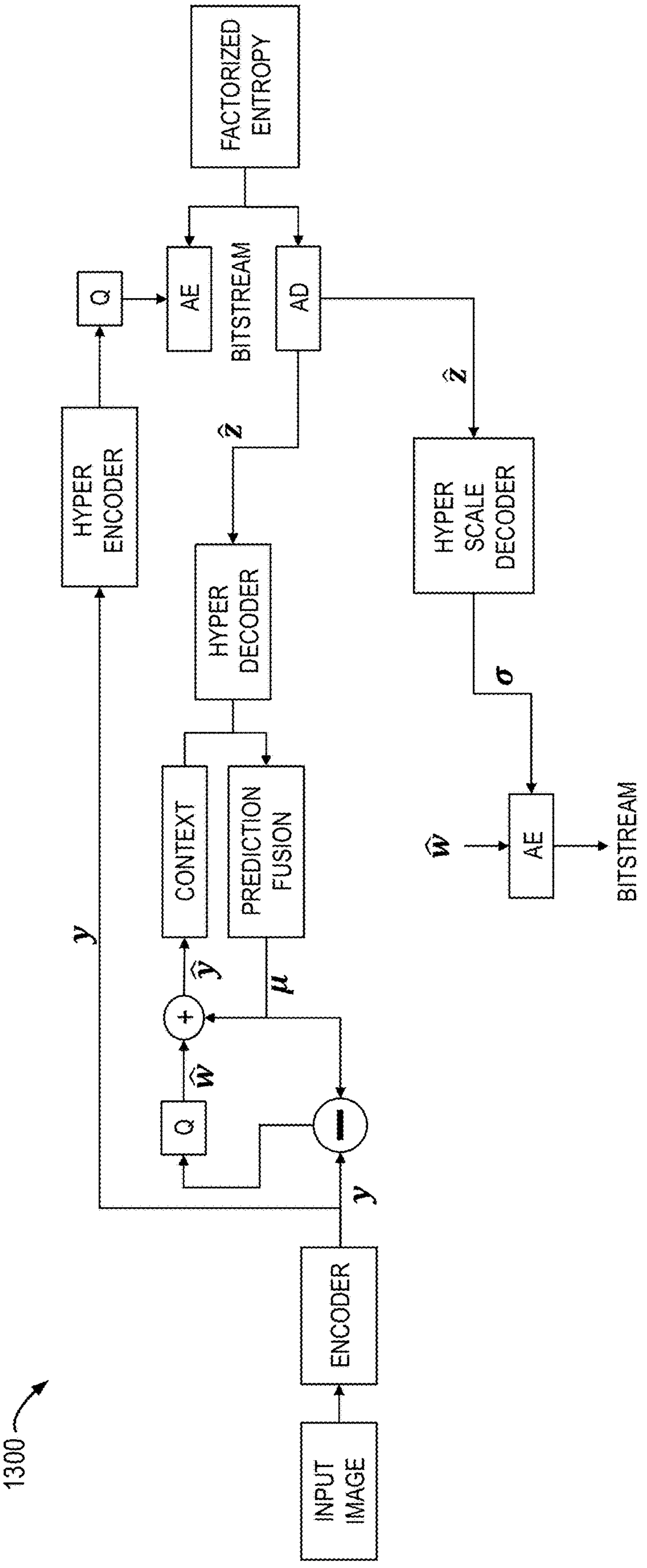
FIG. 13 illustrates another encoding process according to some embodiments of the present disclosure.

The FIG. 13 depicts another exemplary implementation of the encoder of the solution. Compared to the FIG. 12, in FIG. 12 the same quantized hyper latent is used as input to the hyper decoder and hyper scale decoder modules. The rest of the operations are same as explained above.

4.3. The Difference Between the State of the Art and the Solution

There are 3 major differences between the state of the art and the solution.

1. The arithmetic encoding and decoding is performed independently of the autoregressive subnetwork (first subnetwork). This way, the fully sequential arithmetic encoding/decoding process can be performed by a processing unit that is fast like a CPU. A new subnetwork (second subnetwork) is introduced to estimate the probability parameters that are used by arithmetic encoding/decoding process.
2. The arithmetic encoding/decoding process are used to encode/decode the quantized latent residual, instead of the quantized latent as in state of the art.
3. The autoregressive subnetwork is used only to estimate the mean of the latent. In the state of the art, it is used to estimate the mean and variance of a gaussian distribution, which is then used by arithmetic encoder and decoder to encode/decode the samples of quantized latent.

4.4. Benefit of the Solution

The benefit of the solution is as follows:

1. The entropy decoding (e.g. arithmetic decoding) process, which is a simple but fully serial operation, can be performed independently. For example entropy decoding process can be performed by a processing unit that is suitable for performing serial operations quickly, such as a CPU. Once the operation of entropy decoding is complete, the obtained data (quantized residual latent) can be transferred to a GPU.
2. The computationally heavy but easily parallelizable modules (such as context and entropy parameters modules) can be performed independently of arithmetic encoding/decoding. For example a processing unit that is suitable for massive parallel processing (like a GPU) can be used to perform these operations.
3. The idle processing times are eliminated.

According to the solution, the CPU and GPU can be used in tandem. As example the decoding process can be performed as follows:

1. First perform and complete the entropy decoding process. The whole process is completed, and all samples of the quantized latent residual are obtained.
2. Transfer the obtained data to GPU. The data transfer happens only once.
3. Perform and complete the context and entropy parameters modules by the GPU. No idle waiting happens in GPU. The quantized latent is obtained.
4. Perform the synthesis transform (the decoder). The reconstructed image is obtained.

Compared to the third example in section 3.2, the solution eliminates back-and-forth data transfer between CPU and GPU when both CPU and GPU are used for decoding. Moreover it eliminates idle waiting times.

In fact the solution can achieve an impressive 10 times speed-up in the decoding. Moreover with the help of the clever design, it does not suffer from any degradation in compression efficiency.

4.5. Solution Examples

The detailed solutions below should be considered as examples to explain general concepts. These solutions should not be interpreted in a narrow way. Furthermore, these solutions can be combined in any manner.

1. In one example, more than one subnetwork may be utilized as hyper encoders/decoders for hyper information.
   a. In one example, at least one subnetwork is utilized to generate hyper information which is depended by the parsing process for the latent information.
   b. In one example, at least one subnetwork is utilized to generate hyper information which is NOT depended by the parsing process for the latent information.
   c. In one example, at least one subnetwork is utilized to generate hyper information which is used to predict the latent signal.
   d. In one example, the hyper information may comprise statistical information or probability distribution information for the latent signal which may be quantized.
      i. The statistical information or probability distribution information may comprise the mean value of the latent signal.
      ii. The statistical information or probability distribution information may comprise the variance of the latent signal.
2. In one example, the latent signal may be coded in a predictive way.
   a. In one example, $y'=y-p$ may be coded at encoder where y is a latent sample and p is the prediction.
      i. Correspondingly, $y^*=y'+p$ may be reconstructed at decoder.
   b. In one example, y may be quantized before the prediction procedure.
   c. In one example, y may not be quantized before the prediction procedure.
   d. In one example, p may be quantized before the prediction procedure.
   e. In one example, p may not be quantized before the prediction procedure.
   f. In one example, y' may be quantized after the prediction procedure.
   g. In one example, y' may not be quantized after the prediction procedure.
   h. In one example, at least one subnetwork may be utilized to generate the prediction p.
   i. In one example, at least one previously decoded $y^*$ or y' may be utilized to generate the prediction p for the current y or $y^*$.

5. Embodiments

1. Decoder Embodiment

An image or video decoding method, comprising the steps of:

Obtaining a sample of a quantized residual latent $\hat{w}$ using a bitstream and the output of a first subnetwork, wherein the first subnetwork is not autoregressive.

Obtaining a prediction value mean using a second subnetwork and already reconstructed samples of a quantized latent $\hat{y}$.

Reconstructing the next sample of the quantized latent $\hat{y}$ using the quantized residual sample $\hat{w}$ and the prediction mean.

Obtaining the reconstructed image using the quantized latent $\hat{y}$ and a synthesis transform.

2. Encoder Embodiment

An image or video encoding method, comprising the steps of:

First transforming an input image using an analysis transform to obtain a latent y.

Obtaining a prediction value mean, using a second network and already reconstructed samples (if available) of a quantized latent $\hat{y}$.

Subtracting the prediction value from a sample of the latent to obtain a residual latent sample w.

Quantizing the residual latent sample ($\hat{w}$) and adding to the prediction value to obtain a sample of the quantized latent $\hat{y}$.

Obtaining the bitstream using a first subnetwork and the samples of quantized residual latent samples $\hat{w}$, wherein the first subnetwork is not auto-regressive.

3. According to embodiments 1 and 2, wherein;

The first subnetwork takes a first quantized hyper latent as input and generates probability parameters.

4. According to embodiment 1 or 3,

Obtaining of the sample of a quantized residual latent comprises entropy decoding, wherein the probability parameters and a bitstream is used as input.

5. According to embodiment 2 or 3,

Obtaining of the bitstream comprises entropy encoding, wherein the probability parameters and quantized residual latent are inputs.

6. According to embodiments 1 to 5,

The probability parameters do not include a mean value.

7. According to embodiments 1 to 6,

A zero mean probability distribution is used in entropy encoding or entropy decoding.

8. According to embodiments 1 to 7,

The second subnetwork takes a second quantized hyper latent as input, in addition to the already reconstructed samples of quantized latent.

9. According to embodiment 8,

The first and the second quantized hyper latent are same.

10. According to embodiments 1 to 9, The quantized hyper latent are obtained from a bitstream in the decoder.

11. According to embodiments 2 to 10,

The quantized hyper latent are obtained from the latent y or quantized latent $\hat{y}$ using a subnetwork.

12. According to embodiments 1 to 11,

The second subnetwork is autoregressive.

13. According to embodiments 1 to 12,

The second subnetwork comprises a context module.

14. According to embodiments 1 to 13, The second subnetwork comprises a hyper decoder module.

More details of the embodiments of the present disclosure will be described below which are related to neural network-based data coding. As used herein, the term "data" may refer to an image, a picture in a video, or any other data suitable to be coded.

As discussed above, the existing image compression networks include an autoregressive model (e.g., the context model) to improve the compression performance. However, the autoregressive model is interleaved with the inherently serial entropy decoding process. In this regard, the decoding process is inherently serial and cannot be efficiently parallelized, which render the decoding process very slow.

To solve the above problems and some other problems not mentioned, data processing solutions as described below are disclosed.

Figure 14:
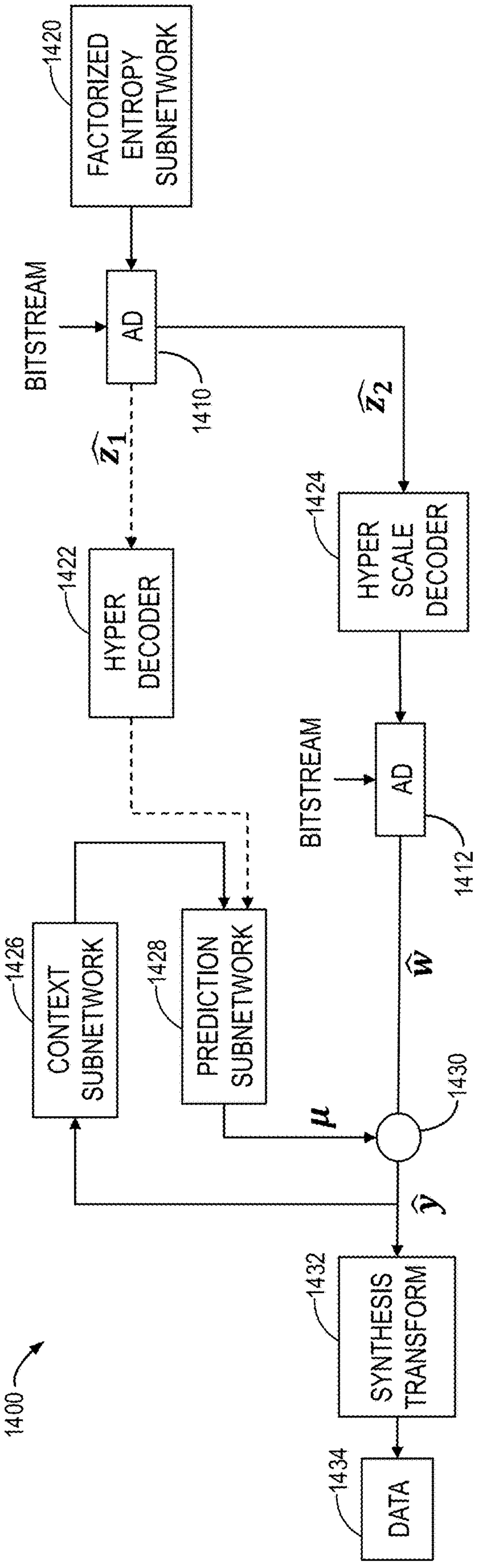
FIG. 14 illustrates an example data decoding process according to some embodiments of the present disclosure.

FIG. 14 illustrates an example data decoding process 1400 according to some embodiments of the present disclosure. For example, the data decoding process 1400 may be performed by the data decoder 124 as shown in FIG. 1. It should be understood that the data decoding process 1400 may also include additional blocks not shown, and/or blocks shown may be omitted. The scope of the present disclosure is not limited in this respect.

As shown in FIG. 14, the bitstream may be inputted into a first entropy decoder 1410. The first entropy decoder 1410 may decode the bitstream based on probability distribution information generated by a factorized entropy subnetwork 1420. In some embodiments, the factorized entropy subnetwork 1420 may generate the probability distribution information by using a predetermined template, for example by using predetermined mean and variance values in the case of gaussian distribution. The entropy decoding process performed by the first entropy decoder 1410 may be an arithmetic decoding process, a Huffman decoding process, or the like.

The output of the first entropy decoder 1410 may comprise a second quantized hyper latent representation (denoted as $\widehat{z_2}$ in FIG. 14) of the data. The second quantized hyper latent representation may be processed by a hyper scale decoder subnetwork 1424 (also referred to as a fifth subnetwork hereinafter) to generate second hyper information. By way of example rather than limitation, the second hyper information may comprise second probability distribution information (also referred to as statistical information or probability parameters) for samples of latent representation of the data. In the example shown in FIG. 14, the second probability distribution information may comprise a variance (denoted as $\sigma$ in FIG. 14) of the latent samples. In another example, the second probability distribution information may comprise a standard deviation of the latent samples. It should be understood that the probability distribution information may comprise any other suitable information. The scope of the present disclosure is not limited in this respect.

The second entropy decoder 1412 may decode the bitstream by performing an entropy decoding process on the bitstream based on the second hyper information. In one example, the entropy decoding process may be performed by using a zero mean probability distribution. Additionally or alternatively, the entropy decoding process may be performed by using a variance. The entropy decoding process performed by the second entropy decoder 1412 may be an arithmetic decoding process, a Huffman decoding process, or the like.

The output of the second entropy decoder 1412 may comprise a second part (denoted as $\hat{w}$ in FIG. 14) of a first sample (i.e., the current sample to be reconstructed at the decoder) of a reconstructed latent representation of the data. As used herein, the term "reconstructed latent representation" means that samples in the representation are obtained through a reconstruction process. In one example, the second part may be decoded from a sub-bitstream of the bitstream. By way of example rather than limitation, the second part may be referred to as a quantized residual or a residual of the first sample.

At block 1430, the first sample may be reconstructed based on the second part and a first part (denoted as $\mu$ in FIG. 14) of the first sample. By way of example rather than limitation, the first sample may be determined to be a sum of the first part and the second part. Given that the second part of samples of the reconstructed latent representation are quantized at the encoder which will be detailed below, the reconstructed latent representation may also be referred to as a quantized latent representation.

The first part of the first sample may be determined based on a set of samples of a reconstructed latent representation. By way of example rather than limitation, the set of samples may comprise a plurality of decoded neighboring samples of the first sample. In one example, the set of samples may be adjacent to the first sample. In another example, at least one sample in the set of samples may be non-adjacent to the first sample. Alternatively, the set of samples may also comprise only one sample. It should be understood that the set of samples may also comprises any other suitable samples of the reconstructed latent representation. The scope of the present disclosure is not limited in this respect.

As shown in FIG. 14, a set of samples may be inputted into a context subnetwork 1426, which may also be referred to as a first subnetwork hereinafter. In some embodiments, the context subnetwork 1426 is autoregressive. The context subnetwork 1426 generates intermediate information based on the set of samples. By way of example rather than limitation, the intermediate information may reflect the mean value of the set of samples. The prediction subnetwork 1428 (also referred to as a second subnetwork hereinafter) may generate the first part of the first sample based on the output of the context subnetwork 1426. In one example, the first part may be a prediction of the first sample. In another example, the first part may be a predicted mean value of the first sample. It should be understood that the context subnetwork 1426 may also be referred to as a context model, a context model subnetwork, and/or the like. Moreover, the prediction subnetwork may also be referred to as a fusion subnetwork, a prediction fusion subnetwork, and/or the like.

In some additional embodiments, for generating the first part of the first sample, the prediction subnetwork 1428 may also utilize further information in addition to the output of the context subnetwork 1426. In one example, the prediction subnetwork 1428 may generate the first part of the first sample based on the output of the context subnetwork 1426 and a first hyper information. This will be described in detail below.

In such a case, the output of the first entropy decoder 1410 may further comprise a first quantized hyper latent representation (denoted as $\hat{z_1}$ in FIG. 14) of the data. In one example, the first quantized hyper latent representation may be the same as the second quantized hyper latent representation. Alternatively, the first quantized hyper latent representation may be different from the second quantized hyper latent representation. In this case, the first quantized hyper latent representation may be decoded from a first sub-bitstream of the bitstream, while the second quantized hyper latent representation may be decoded from a second sub-bitstream of the bitstream. It should be understood that the first quantized hyper latent representation and the second first quantized hyper latent representation may also be obtained in any other suitable manner. The scope of the present disclosure is not limited in this respect.

The first quantized hyper latent representation may be processed by a hyper decoder subnetwork 1422 (also referred to as a third subnetwork hereinafter) to generate a first hyper information. By way of example rather than limitation, the first hyper information may comprise first probability distribution information (also referred to as statistical information or probability parameters) for samples of latent representation of the data. In one example, the first probability distribution information may comprise a mean value of the latent sample. Additionally or alternatively, the first hyper information may comprise prediction information of the latent sample. It should be understood that the probability distribution information may comprise any other suitable information. The scope of the present disclosure is not limited in this respect.

After obtaining the reconstructed latent representation of the data, a synthesis transform may be performed on the reconstructed latent representation at the synthesis transform subnetwork 1432 to obtain the reconstructed data 1434, i.e., a reconstruction of the data.

It is seen that, in the data decoding process 1400, the entropy coding process at the second entropy decoder 1412 is performed without using any input from the context subnetwork 1426 and the prediction subnetwork 1428. In this regard, the proposed data decoding process enables a decoupling of a sequential entropy coding process from computationally complex neural network. Thereby, the proposed decoding process advantageously enables the entropy coding process to be performed independently of the neural network, and thus the coding efficiency can be improved.

The data decoding process according to some embodiments of the present disclosure has been discussed above. A data encoding process corresponding to the data decoding process will be described with reference to FIG. 15 hereinafter.

Figure 15:
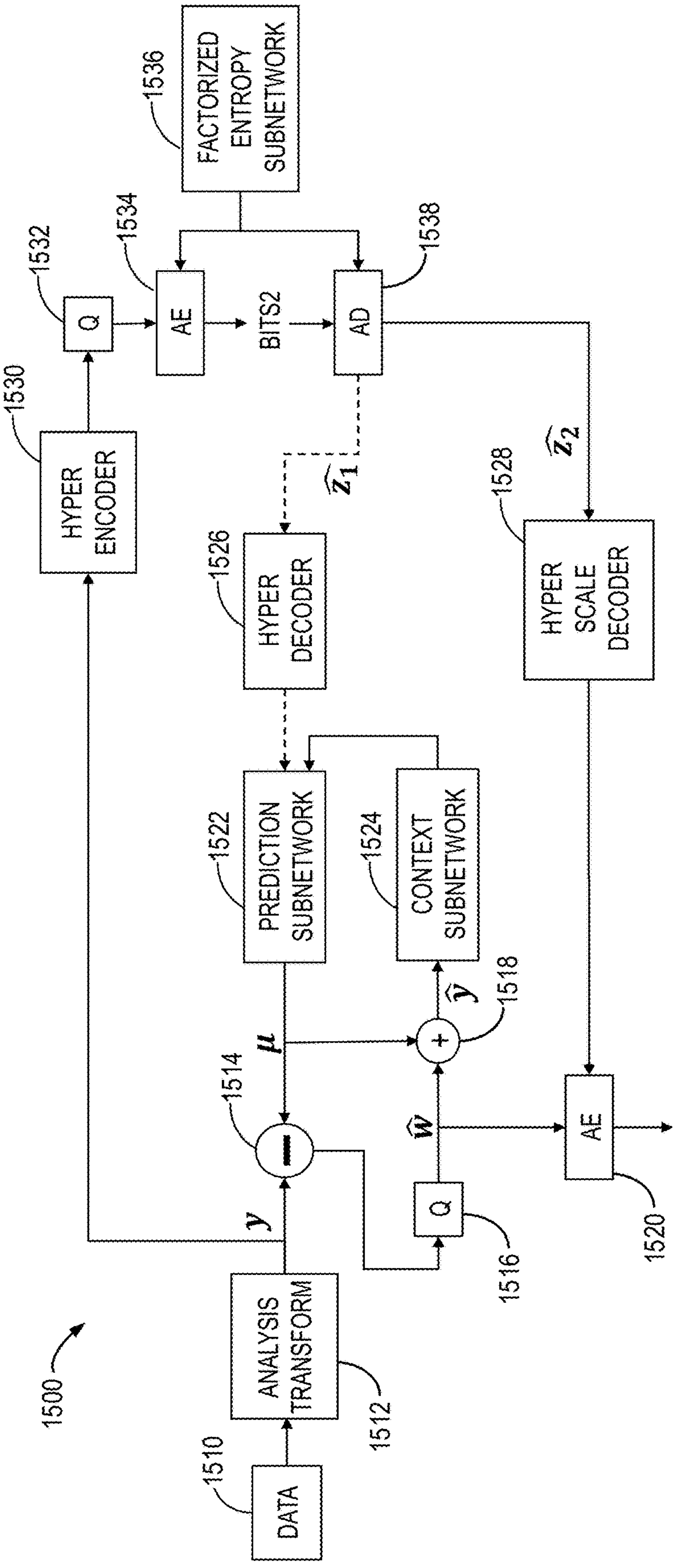
FIG. 15 illustrates an example data encoding process according to some embodiments of the present disclosure.

FIG. 15 illustrates an example data encoding process 1500 according to some embodiments of the present disclosure. For example, the data encoding process 1500 may be performed by the data encoder 114 as shown in FIG. 1. It should be understood that the data encoding process 1500 may also include additional blocks not shown, and/or blocks shown may be omitted. The scope of the present disclosure is not limited in this respect.

As shown in FIG. 15, at the analysis transform subnetwork 1512, an analysis transform may be performed on the data 1510 to obtain a latent representation (denoted as y in FIG. 15) of the data 1510. The data 1510 may comprises an image or one or more pictures in a video. The latent representation is processed by a hyper encoder subnetwork 1530 (also referred to as a fourth subnetwork hereinafter) to generate a hyper latent representation. At a quantizer block 1532, the generated hyper latent representation may be quantized to obtain a quantized hyper latent representation. The quantized hyper latent representation may be encoded into a bitstream, which may be a part of the bitstream of the data, based on probability distribution information generated by a factorized entropy subnetwork 1536. In one example, the quantized hyper latent representation may comprise the above-mentioned second quantized hyper latent representation. In another example, the quantized hyper latent representation may further comprise the above-mentioned first quantized hyper latent representation. An entropy encoding process may be performed by the entropy encoder 1534 on the quantized hyper latent representation to obtain the part of the bitstream. Moreover, an entropy decoding process may be performed at an entropy decoder 1538 on the part of the bitstream based on probability distribution information generated by a factorized entropy subnetwork 1536, so as to reconstruct the quantized hyper latent representation.

At block 1514, a residual may be obtained based on a difference between a second sample of the latent representation and a first part of the reconstructed second sample. The second sample corresponds to the above-mentioned first sample and the latent representation corresponds to the above-mentioned reconstructed latent representation. In other words, the first sample is a reconstructed second sample, i.e., a reconstructed version of the second sample.

The first part of the first sample may be generated by using the prediction subnetwork 1522 and the context subnetwork 1524 in a manner similar to the data decoding process 1400. In some embodiments, the second sample may be quantized before being processed at block 1514. Alternatively, the second sample may be not quantized.

The residual may be quantized at a quantizer block 1516 to obtain a second part of the first sample. In such a case the second part is a quantized residual of the first sample. Alternatively, the residual may also not be quantized and thus the block 1516 may be omitted. The first sample may be determined to be a sum of the first part and the second part at block 1518.

An entropy encoding process may be performed by the entropy encoder 1520 on the second part of samples of the reconstructed latent representation based on the second hyper information, in order to obtain a further part of the bitstream. The second hyper information may be generated by the hyper scale decoder subnetwork 1528 based on a second quantized hyper latent representation of the data 1510 in a manner similar to the data decoding process 1400.

In one example, the entropy encoding process may be performed by using a zero mean probability distribution. Additionally or alternatively, the entropy encoding process may be performed by using a variance. The entropy encoding process performed by the entropy encoder 1520, 1534 may be an arithmetic encoding process, a Huffman encoding process, or the like.

Although example data coding processes are described above with respect to FIGS. 14 and 15, it should be understood that any other suitable variants of the data coding process are also conceivable in view of the present disclosure. In another example data coding process, a lightweight hyper decoder subnetwork may be employed to generate the first part of the first sample based on the first quantized hyper latent representation, and the context subnetwork and the prediction subnetwork may be removed.

In a further example data coding process, a multistage context model may be employed, and the prediction subnetwork may be removed. In such a process, the latent presentation of the data may be partitioned into a plurality of regions, and each of the plurality of regions may comprise four latent samples, which may be denoted as first latent, second latent, third latent and fourth latent hereinafter. All of the regions are processed in parallel, and thus four consecutive steps are involved at the decoder to progressively reconstruct the latent representation.

At the first step, only hyperpriors are used to generate the entropy parameters of first latents for entropy decoding and reconstruction. Then decoded first latents are processed with masked 3×3 convolutions to produce second context features for the second stage. At the second step, co-located hyperpriors, and second context features are processed to generate proper entropy parameters to reconstruct second latents that are subsequently convoluted to derive third context features. At the third step, both hyperpriors at first step and context features at first step and second step are used to derive the entropy parameters to properly decode third latents. Similarly, third latents are then convoluted to derive fourth context features for the fourth step. In the end (at the fourth step), fourth latents are reconstructed in a way similar to the previous steps, so as to obtain the complete reconstructed latent representation.

It should be understood that the above illustrations and/or examples are described merely for purpose of description. The scope of the present disclosure is not limited in this respect. The embodiments of the present disclosure should be considered as examples to explain the general concepts and should not be interpreted in a narrow way. Furthermore, these embodiments can be applied individually or combined in any manner.

Figure 16:
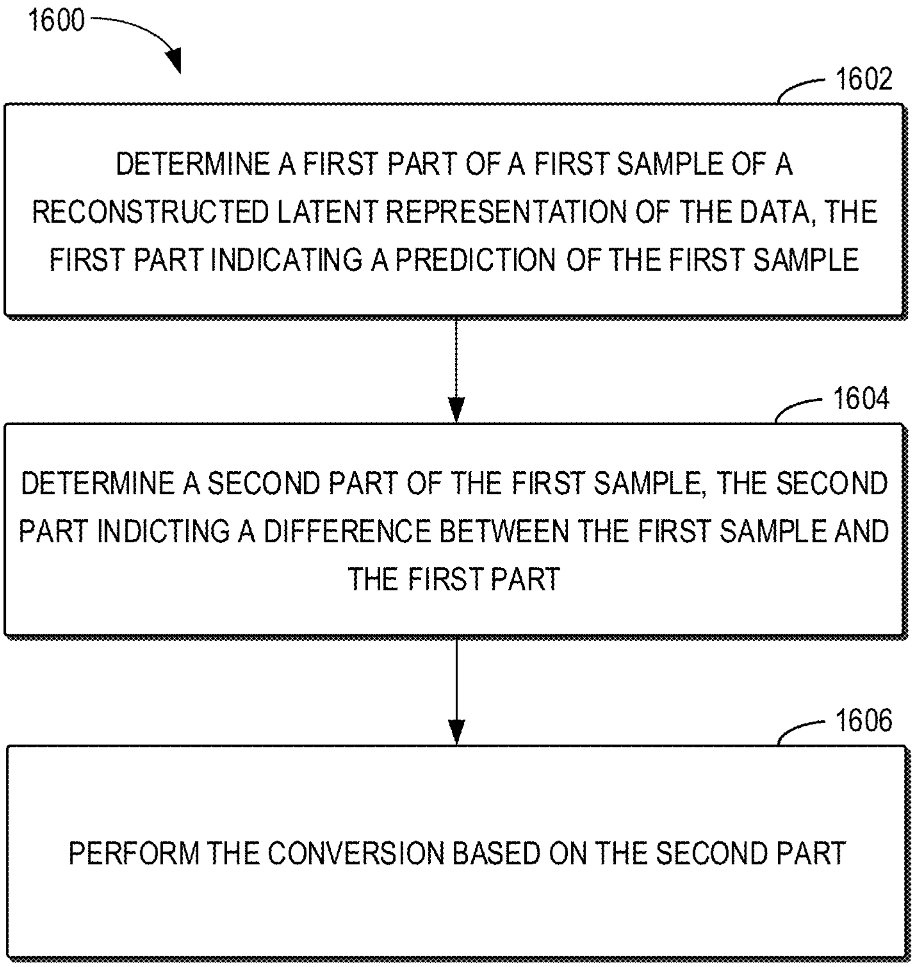
FIG. 16 illustrates a flowchart of a method for data processing in accordance with some embodiments of the present disclosure.

FIG. 16 illustrates a flowchart of a method 1600 for data processing in accordance with some embodiments of the present disclosure. The method 1600 may be implemented during a conversion between the data and a bitstream of the data. As shown in FIG. 16, the method 1600 starts at 1602, a first part of a first sample of a reconstructed latent representation of the data may be determined. The first part indicates a prediction of the first sample. By way of example rather than limitation, the first part of the first sample may be determined based on a set of samples of the reconstructed latent representation. In one example, the first part may be a prediction of the first sample. Alternatively, the first part may be predicted mean value of the first sample. In some embodiments, the reconstructed latent representation may be a quantized latent representation of the data.

In some embodiments, an intermediate information may be generated based on the set of samples by using a first subnetwork. Furthermore, the first part may be generated based on the intermediate information by a second subnetwork. By way of example rather than limitation, the first subnetwork may be autoregressive, and it may be referred to as a context model subnetwork, a context subnetwork, a context model, and/or the like. In addition, the second subnetwork may be referred to as a prediction subnetwork, a fusion subnetwork, a prediction fusion subnetwork, and/or the like.

In some alternative embodiments, the first part may be generated based on a first quantized hyper latent representation. For example, the generation of the first part may comprise processing the first quantized hyper latent representation by using a lightweight hyper decoder subnetwork, which may also be referred to as a hyper decoder subnetwork. By way of example, the output of processing the first quantized hyper latent representation may be determined as the first part of the first sample. The generation of the first quantized hyper latent representation will be described in detail below.

At 1604, a second part of the first sample is determined. The second part indicates a difference between the first sample and the first part. In one example, the second part may be the difference between the first sample and the first part. By way of example, the second part may be obtained by subtracting the first part from the first sample. The second part may also be referred to as a residual or a quantized residual of the first sample.

At 1606, the conversion is performed based on the second part. In one example, the conversion may include encoding the data into the bitstream. Alternatively or additionally, the conversion may include decoding the data from the bitstream. It should be understood that the above illustrations are described merely for purpose of description. The scope of the present disclosure is not limited in this respect.

In view of the foregoing, a reconstructed latent sample is divided into two parts, which enables a decoupling of a sequential entropy coding process from computationally complex neural network. Compared with the conversion solution where the entropy coding process and the neural network operations are interleaved, the proposed method advantageously enables the entropy coding process to be performed independently of the neural network, and thus the coding efficiency can be improved.

In some alternative embodiments, at 1602, the intermediate information may be generated based on the set of samples by using the first subnetwork. In addition, first hyper information may be determined based on a first quantized hyper latent representation by using a third subnetwork. Furthermore, the first part may be generated based on the intermediate information and the first hyper information by using the second subnetwork. By way of example rather than limitation, the third subnetwork may be a hyper decoder subnetwork.

In some embodiments, the first quantized hyper latent representation may be determined based on the bitstream. For example, the first quantized hyper latent representation may be decoded from the bitstream in the decoding process. Alternatively, the first quantized hyper latent representation may be generated by using a fourth subnetwork based on a latent representation of the data. By way of example rather than limitation, the fourth subnetwork may be a hyper encoder subnetwork.

In some embodiments, the first hyper information may comprise first probability distribution information. In one example, the first probability distribution information may comprise a mean value. Additionally or alternatively, the first hyper information may comprise prediction information.

In some embodiments, at 1604, second hyper information may be generated based on a second quantized hyper latent representation by using a fifth subnetwork. In one example, the fifth subnetwork may be a hyper scale decoder subnetwork. The second quantized hyper latent representation may be determined based on a first portion of the bitstream. For example, the second quantized hyper latent representation may be decoded from the first portion of the bitstream. Moreover, at 1604, the second part may be obtained by performing an entropy decoding process on a second portion of the bitstream based on the second hyper information. The second portion may be different from the first portion. For example, the first portion and the second portion may be two sub-bitstreams of the bitstream.

In some embodiments, the second hyper information may comprise second probability distribution information. In one example, the second probability distribution information may comprise a variance. In another example, the second probability distribution information may comprise a standard deviation. It should be understood that the above examples are described merely for purpose of description. The scope of the present disclosure is not limited in this respect.

In some embodiments, the above-mentioned entropy decoding process may be an arithmetic decoding process. Additionally or alternatively, the entropy decoding process may be performed by using a zero mean probability distribution. In some further embodiments, the entropy decoding process may be performed by using a variance.

In some embodiments, the second quantized hyper latent representation may be the same as the first quantized hyper latent representation. Alternatively, the second quantized hyper latent representation may be different from the first quantized hyper latent representation.

In some embodiments, at 1606, the first sample may be determined based on the first part and the second part. By way of example rather than limitation, the first sample may be determined based on a sum of the first part and the second part. Moreover, the conversion may be performed based on a synthesis transform on the first sample.

In some embodiments, at 1604, the second part may be determined based on the first part and a second sample of a latent representation of the data. The second sample corresponds to the first sample and the latent representation corresponds to the reconstructed latent representation. In other words, the first sample is a reconstructed second sample, i.e., a reconstructed version of the second sample. In some embodiments, the latent representation may be obtained by performing an analysis transform on the data.

In some embodiments, a residual may be obtained based on a difference between the first part and the second sample, and the second part may be obtained by quantizing the residual. Alternatively, the residual may not be quantized to obtain the second part.

In some embodiments, the first sample may be determined based on the first part and the second part. By way of example rather than limitation, the first sample may be determined based on a sum of the first part and the second part.

In some embodiments, the second sample is quantized before being used to determine the second part. Alternatively, the second sample is not quantized before being used to determine the second part.

In some embodiments, the first part is quantized before being used to determine the second part and the first sample. Alternatively, the first part is not quantized before being used to determine the second part and the first sample.

In some embodiments, at 1606, a second quantized hyper latent representation may be generated based on a latent representation of the data by using a fourth subnetwork. Moreover, second hyper information may be generated based on the second quantized hyper latent representation by using a fifth subnetwork, and an entropy encoding process may be performed on the second part based on the second hyper information.

In some embodiments, the fourth subnetwork may be a hyper encoder subnetwork, or the fifth subnetwork may be a hyper scale decoder subnetwork. In some embodiments, the entropy encoding process may be an arithmetic encoding process. In one example, the entropy encoding process may be performed by using a zero mean probability distribution. In another example, the entropy encoding process may be performed by using a variance.

In some embodiments, the second quantized hyper latent representation may be the same as the first quantized hyper latent representation. In such a case, the entropy encoding process may be performed on the first quantized hyper latent representation.

In some embodiments, the second quantized hyper latent representation may be different from the first quantized hyper latent representation. In such a case, at 1606, the entropy encoding process may be performed on the first quantized hyper latent representation and the second quantized hyper latent representation.

According to embodiments of the present disclosure, a non-transitory computer-readable recording medium is proposed. A bitstream of data is stored in the non-transitory computer-readable recording medium. The bitstream can be generated by a method performed by a data processing apparatus. According to the method, a first part of a first sample of a reconstructed latent representation of the data is determined. The first part indicates a prediction of the first sample. In addition, a second part of the first sample is determined. The second part indicates a difference between the first sample and the first part. Moreover, the bitstream is generated based on the second part.

According to embodiments of the present disclosure, a method for storing a bitstream of data is proposed. In the method, a first part of a first sample of a reconstructed latent representation of the data is determined. The first part indicates a prediction of the first sample. In addition, a second part of the first sample is determined. The second part indicates a difference between the first sample and the first part. Moreover, the bitstream is generated based on the second part and the bitstream is stored in the non-transitory computer-readable recording medium.

Implementations of the present disclosure can be described in view of the following clauses, the features of which can be combined in any reasonable manner.

Clause 1. A method for data processing, comprising: determining, during a conversion between data and a bitstream of the data, a first part of a first sample of a reconstructed latent representation of the data, the first part indicating a prediction of the first sample; determining a second part of the first sample, the second part indicating a difference between the first sample and the first part; and performing the conversion based on the second part.

Clause 2. The method of clause 1, wherein determining the first part comprises: determining the first part based on a set of samples of the reconstructed latent representation.

Clause 3. The method of clause 2, wherein determining the first part based on the set of samples comprises: generating intermediate information based on the set of samples by using a first subnetwork; and generating the first part based on the intermediate information by a second subnetwork.

Clause 4. The method of clause 3, wherein the first subnetwork is autoregressive.

Clause 5. The method of any of clauses 3-4, wherein the first subnetwork is a context model subnetwork or a context subnetwork, or the second subnetwork is a prediction subnetwork or a fusion subnetwork.

Clause 6. The method of any of clauses 3-5, wherein generating the first part comprises: generating first hyper information based on a first quantized hyper latent representation by using a third subnetwork; and generating the first part based on the intermediate information and the first hyper information by using the second subnetwork.

Clause 7. The method of clause 1, wherein determining the first part comprises: determining the first part based on a first quantized hyper latent representation.

Clause 8. The method of clause 7, wherein determining the first part based on the first quantized hyper latent representation comprises: processing the first quantized hyper latent representation by using a third subnetwork.

Clause 9. The method of clause 6 or 8, wherein the third subnetwork is a hyper decoder subnetwork.

Clause 10. The method of any of clauses 6-9, wherein the first quantized hyper latent representation is determined based on the bitstream, or the first quantized hyper latent representation is generated by using a fourth subnetwork based on a latent representation of the data.

Clause 11. The method of clause 10, wherein the fourth subnetwork is a hyper encoder subnetwork.

Clause 12. The method of any of clauses 6 and 9-11, wherein the first hyper information comprises first probability distribution information.

Clause 13. The method of clause 12, wherein the first probability distribution information comprises a mean value.

Clause 14. The method of any of clauses 6 and 9-11, wherein the first hyper information comprises prediction information.

Clause 15. The method of any of clauses 1-14, wherein determining the second part comprises: generating second hyper information based on a second quantized hyper latent representation by using a fifth subnetwork, the second quantized hyper latent representation being determined based on a first portion of the bitstream; obtaining the second part by performing an entropy decoding process on a second portion of the bitstream based on the second hyper information, the second portion being different from the first portion.

Clause 16. The method of clause 15, wherein the second hyper information comprises second probability distribution information.

Clause 17. The method of clause 16, wherein the second probability distribution information comprises a variance.

Clause 18. The method of any of clauses 15-17, wherein the fifth subnetwork is a hyper scale decoder subnetwork.

Clause 19. The method of any of clauses 15-18, wherein the entropy decoding process is an arithmetic decoding process.

Clause 20. The method of any of clauses 15-19, wherein the entropy decoding process is performed by using a zero mean probability distribution.

Clause 21. The method of any of clauses 15-20, wherein the entropy decoding process is performed by using a variance.

Clause 22. The method of any of clauses 15-21, wherein the second quantized hyper latent representation is the same as the first quantized hyper latent representation, or the second quantized hyper latent representation is different from the first quantized hyper latent representation.

Clause 23. The method of any of clauses 1-22, wherein performing the conversion comprises: determining the first sample based on the first part and the second part; and performing the conversion based on a synthesis transform on the first sample.

Clause 24. The method of clause 23, wherein the first sample is determined based on a sum of the first part and the second part.

Clause 25. The method of any of clauses 1-14, wherein determining the second part comprises: determining the second part based on the first part and a second sample of a latent representation of the data, the second sample corresponding to the first sample and the latent representation corresponding to the reconstructed latent representation.

Clause 26. The method of clause 25, wherein the latent representation is obtained by performing an analysis transform on the data.

Clause 27. The method of any of clauses 25-26, wherein determining the second part based on the first part and a second sample comprises: obtaining a residual based on a difference between the first part and the second sample; and obtaining the second part by quantizing the residual.

Clause 28. The method of any of clauses 25-26, wherein the first sample is determined based on the first part and the second part.

Clause 29. The method of clause 28, wherein the first sample is determined based on a sum of the first part and the second part.

Clause 30. The method of any of clauses 25-29, wherein the second sample is quantized before being used to determine the second part.

Clause 31. The method of any of clauses 25-30, wherein the first part is quantized before being used to determine the second part and the first sample.

Clause 32. The method of any of clause 1-14 or 25-31, wherein performing the conversion comprises: generating a second quantized hyper latent representation based on a latent representation of the data by using a fourth subnetwork; generating second hyper information based on the second quantized hyper latent representation by using a fifth subnetwork; and performing an entropy encoding process on the second part based on the second hyper information.

Clause 33. The method of clause 32, wherein the second hyper information comprises second probability distribution information.

Clause 34. The method of clause 33, wherein the second probability distribution information comprises a variance.

Clause 35. The method of any of clauses 32-34, wherein the fourth subnetwork is a hyper encoder subnetwork, or the fifth subnetwork is a hyper scale decoder subnetwork.

Clause 36. The method of any of clauses 32-35, wherein the entropy encoding process is an arithmetic encoding process.

Clause 37. The method of any of clauses 32-36, wherein the entropy encoding process is performed by using a zero mean probability distribution.

Clause 38. The method of any of clauses 32-37, wherein the entropy encoding process is performed by using a variance.

Clause 39. The method of any of clauses 32-38, wherein the second quantized hyper latent representation is the same as the first quantized hyper latent representation.

Clause 40. The method of clause 39, wherein performing the conversion further comprises: performing the entropy encoding process on the first quantized hyper latent representation.

Clause 41. The method of any of clauses 32-38, wherein the second quantized hyper latent representation is different from the first quantized hyper latent representation.

Clause 42. The method of any of clauses 41, wherein performing the conversion further comprises: performing the entropy encoding process on the first quantized hyper latent representation and the second quantized hyper latent representation.

Clause 43. The method of any of clauses 1-42, wherein the first part is the prediction of the first sample, or the second part is a quantized residual of the first sample.

Clause 44. The method of any of clauses 1-43, wherein the reconstructed latent representation is a quantized latent representation of the data.

Clause 45. The method of any of clauses 1-44, wherein the data comprise a picture of a video or an image.

Clause 46. The method of any of clauses 1-45, wherein the conversion includes encoding the data into the bitstream.

Clause 47. The method of any of clauses 1-45, wherein the conversion includes decoding the data from the bitstream.

Clause 48. An apparatus for processing video data comprising a processor and a non-transitory memory with instructions thereon, wherein the instructions upon execution by the processor, cause the processor to perform a method in accordance with any of clauses 1-47.

Clause 49. A non-transitory computer-readable storage medium storing instructions that cause a processor to perform a method in accordance with any of clauses 1-47.

Clause 50. A non-transitory computer-readable recording medium storing a bitstream of a video which is generated by a method performed by a video processing apparatus, wherein the method comprises: determining a first part of a first sample of a reconstructed latent representation of the data, the first part indicating a prediction of the first sample; determining a second part of the first sample, the second part indicating a difference between the first sample and the first part; and generating the bitstream based on the second part.

Clause 51. A method for storing a bitstream of a video, comprising: determining a first part of a first sample of a reconstructed latent representation of the data, the first part indicating a prediction of the first sample; determining a second part of the first sample, the second part indicating a difference between the first sample and the first part; generating the bitstream based on the second part; and storing the bitstream in a non-transitory computer-readable recording medium.

Example Device

Figure 17:
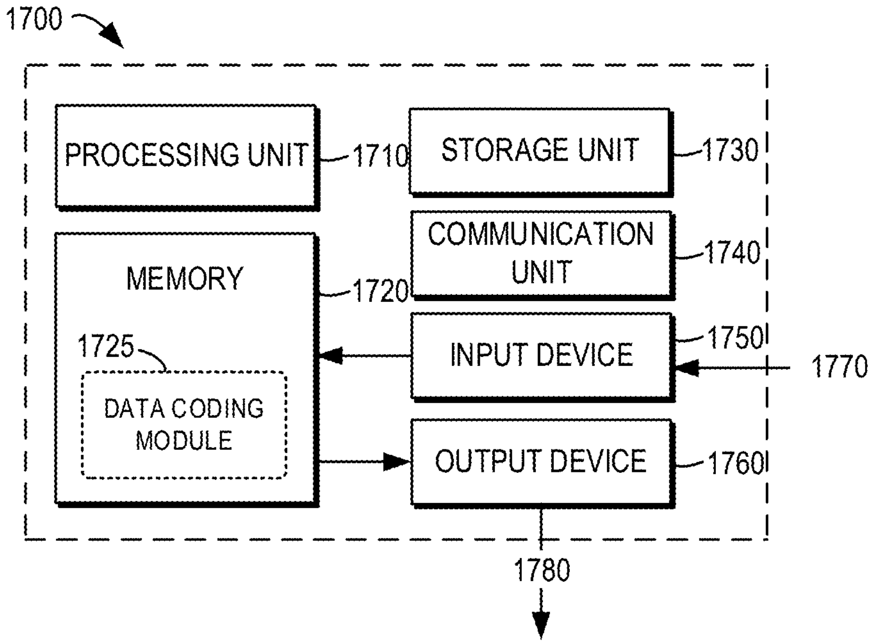
FIG. 17 illustrates a block diagram of a computing device in which various embodiments of the present disclosure can be implemented.

FIG. 17 illustrates a block diagram of a computing device 1700 in which various embodiments of the present disclosure can be implemented. The computing device 1700 may be implemented as or included in the source device 110 (or the data encoder 114) or the destination device 120 (or the data decoder 124).

It would be appreciated that the computing device 1700 shown in FIG. 17 is merely for purpose of illustration, without suggesting any limitation to the functions and scopes of the embodiments of the present disclosure in any manner.

As shown in FIG. 17, the computing device 1700 includes a general-purpose computing device 1700. The computing device 1700 may at least comprise one or more processors or processing units 1710, a memory 1720, a storage unit 1730, one or more communication units 1740, one or more input devices 1750, and one or more output devices 1760.

In some embodiments, the computing device 1700 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1700 can support any type of interface to a user (such as "wearable" circuitry and the like).

The processing unit 1710 may be a physical or virtual processor and can implement various processes based on programs stored in the memory 1720. In a multi-processor system, multiple processing units execute computer executable instructions in parallel so as to improve the parallel processing capability of the computing device 1700. The processing unit 1710 may also be referred to as a central processing unit (CPU), a microprocessor, a controller or a microcontroller.

The computing device 1700 typically includes various computer storage medium. Such medium can be any medium accessible by the computing device 1700, including, but not limited to, volatile and non-volatile medium, or detachable and non-detachable medium. The memory 1720 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1730 may be any detachable or non-detachable medium and may include a machine-readable medium such as a memory, flash memory drive, magnetic disk or another other media, which can be used for storing information and/or data and can be accessed in the computing device 1700.

The computing device 1700 may further include additional detachable/non-detachable, volatile/non-volatile memory medium. Although not shown in FIG. 17, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1740 communicates with a further computing device via the communication medium. In addition, the functions of the components in the computing device 1700 can be implemented by a single computing cluster or multiple computing machines that can communicate via communication connections. Therefore, the computing device 1700 can operate in a networked environment using a logical connection with one or more other servers, networked personal computers (PCs) or further general network nodes.

The input device 1750 may be one or more of a variety of input devices, such as a mouse, keyboard, tracking ball, voice-input device, and the like. The output device 1760 may be one or more of a variety of output devices, such as a display, loudspeaker, printer, and the like. By means of the communication unit 1740, the computing device 1700 can further communicate with one or more external devices (not shown) such as the storage devices and display device, with one or more devices enabling the user to interact with the computing device 1700, or any devices (such as a network card, a modem and the like) enabling the computing device 1700 to communicate with one or more other computing devices, if required. Such communication can be performed via input/output (I/O) interfaces (not shown).

In some embodiments, instead of being integrated in a single device, some or all components of the computing device 1700 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1700 may be used to implement data encoding/decoding in embodiments of the present disclosure. The memory 1720 may include one or more data coding modules 1725 having one or more program instructions. These modules are accessible and executable by the processing unit 1710 to perform the functionalities of the various embodiments described herein.

In the example embodiments of performing data encoding, the input device 1750 may receive data as an input 1770 to be encoded. The data may be processed, for example, by the data coding module 1725, to generate an encoded bitstream. The encoded bitstream may be provided via the output device 1760 as an output 1780.

In the example embodiments of performing data decoding, the input device 1750 may receive an encoded bitstream as the input 1770. The encoded bitstream may be processed, for example, by the data coding module 1725, to generate decoded data. The decoded data may be provided via the output device 1760 as the output 1780.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for visual data processing, comprising:

determining, during a conversion between visual data and a bitstream of the visual data with a neural network (NN)-based model, a first part of a first sample of a reconstructed latent representation of the visual data, the first part indicating a prediction of the first sample;

determining a second part of the first sample, the second part indicating a difference between the first sample and the first part; and performing the conversion based on the second part, wherein determining the first part comprises:

generating intermediate information based on a set of already reconstructed samples of the reconstructed latent representation by using a first subnetwork in the NN-based model; and generating the first part based on the intermediate information by a second subnetwork in the NN-based model.

2. The method of claim 1, wherein a process for determining samples of the reconstructed latent representation is autoregressive.

3. The method of claim 2, wherein the process is implemented with a multistage context model.

4. The method of claim 1, wherein generating the first part comprises:

generating first hyper information based on a first quantized hyper latent representation by using a third subnetwork in the NN-based model; and generating the first part based on the intermediate information and the first hyper information by using the second subnetwork.

5. The method of claim 1, wherein determining the first part comprises:

determining the first part based on a first quantized hyper latent representation.

6. The method of claim 5, wherein determining the first part based on the first quantized hyper latent representation comprises:

processing the first quantized hyper latent representation by using a third subnetwork in the NN-based model.

7. The method of claim 4, wherein the third subnetwork is a hyper decoder subnetwork.

8. The method of claim 4, wherein the first quantized hyper latent representation is determined based on the bitstream, or wherein the first hyper information comprises prediction information.

9. The method of claim 1, wherein determining the second part comprises:

generating second hyper information based on a second quantized hyper latent representation by using a fifth subnetwork in the NN-based model, the second quantized hyper latent representation being determined based on a first portion of the bitstream; and obtaining the second part by performing an entropy decoding process on a second portion of the bitstream based on the second hyper information, the second portion being different from the first portion.

10. The method of claim 9, wherein the second hyper information comprises a variance, or wherein the fifth subnetwork is a hyper scale decoder subnetwork, or wherein the entropy decoding process is an arithmetic decoding process, or wherein the second quantized hyper latent representation is the same as the first quantized hyper latent representation.

11. The method of claim 1, wherein performing the conversion comprises:

determining the first sample based on the first part and the second part; and performing the conversion based on a synthesis transform on the first sample.

12. The method of claim 11, wherein the first sample is determined based on a sum of the first part and the second part.

13. The method of claim 1, wherein the first part is the prediction of the first sample, or the second part is a quantized residual of the first sample, or wherein the reconstructed latent representation is a quantized latent representation of the visual data, or wherein the visual data comprise a picture of a video or an image.

14. The method of claim 1, wherein the conversion includes encoding the visual data into the bitstream.

15. The method of claim 1, wherein the conversion includes decoding the visual data from the bitstream.

16. An apparatus for processing visual data comprising a processor and a non-transitory memory with instructions thereon, wherein the instructions upon execution by the processor, cause the processor to perform acts comprising:

determining, during a conversion between visual data and a bitstream of the visual data with a neural network (NN)-based model, a first part of a first sample of a reconstructed latent representation of the visual data, the first part indicating a prediction of the first sample;

determining a second part of the first sample, the second part indicating a difference between the first sample and the first part; and performing the conversion based on the second part, wherein determining the first part comprises:

generating intermediate information based on a set of already reconstructed samples of the reconstructed latent representation by using a first subnetwork in the NN-based model; and generating the first part based on the intermediate information by a second subnetwork in the NN-based model.

17. A non-transitory computer-readable storage medium storing instructions that cause a processor to perform acts comprising:

determining, during a conversion between visual data and a bitstream of the visual data with a neural network (NN)-based model, a first part of a first sample of a reconstructed latent representation of the visual data, the first part indicating a prediction of the first sample;

determining a second part of the first sample, the second part indicating a difference between the first sample and the first part; and performing the conversion based on the second part, wherein determining the first part comprises:

generating intermediate information based on a set of already reconstructed samples of the reconstructed latent representation by using a first subnetwork in the NN-based model; and generating the first part based on the intermediate information by a second subnetwork in the NN-based model.

18. A non-transitory computer-readable recording medium storing a bitstream of visual data which is generated by a method performed by a visual data processing apparatus, wherein the method comprises:

determining a first part of a first sample of a reconstructed latent representation of the visual data, the first part indicating a prediction of the first sample;

determining a second part of the first sample, the second part indicating a difference between the first sample and the first part; and generating the bitstream based on the second part, wherein determining the first part comprises;

generating intermediate information based on a set of already reconstructed samples of the reconstructed latent representation by using a first subnetwork in the NN-based model; and generating the first part based on the intermediate information by a second subnetwork in the NN-based model.

* * * * *